US010049439B2

(12) United States Patent
Inoue

(10) Patent No.: US 10,049,439 B2
(45) Date of Patent: *Aug. 14, 2018

(54) IMAGE PROCESSING METHOD, IMAGE PROCESSING APPARATUS, IMAGE CAPTURING APPARATUS AND NON-TRANSITORY COMPUTER-READABLE STORAGE MEDIUM

(71) Applicant: CANON KABUSHIKI KAISHA, Tokyo (JP)

(72) Inventor: Chiaki Inoue, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/599,952

(22) Filed: May 19, 2017

(65) Prior Publication Data

US 2017/0256041 A1 Sep. 7, 2017

Related U.S. Application Data

(63) Continuation of application No. 14/564,683, filed on Dec. 9, 2014, now Pat. No. 9,684,954.

(30) Foreign Application Priority Data

Dec. 11, 2013 (JP) ................................. 2013-255611

(51) Int. Cl.
*G06T 5/50* (2006.01)
*G06T 5/00* (2006.01)
(Continued)

(52) U.S. Cl.
CPC ............... *G06T 5/50* (2013.01); *G06T 5/005* (2013.01); *H04N 13/0007* (2013.01);
(Continued)

(58) Field of Classification Search
CPC ......... G01B 11/022; G06F 2203/04101; G06F 3/042; G06F 3/0425; G06F 3/0426; G06K 9/3233
(Continued)

(56) References Cited

U.S. PATENT DOCUMENTS 6,233,003 B1* 5/2001 Ono ..................... H04N 13/021
348/47
7,734,086 B2 6/2010 Lee et al.
(Continued)

FOREIGN PATENT DOCUMENTS

CN 1825979 A 8/2006
CN 102685369 A 9/2012
(Continued)

OTHER PUBLICATIONS

Cellatoglu et al, Autostereoscopic Imaging Techniques for 3D TV: Proposals for Improvements, Aug. 8, 2013.*
(Continued)

*Primary Examiner* — Shan E Elahi
(74) *Attorney, Agent, or Firm* — Rossi, Kimms & McDowell LLP

(57) ABSTRACT

The image processing method includes acquiring multiple parallax images produced by image capturing of an object, the parallax images having a parallax to one another. The method further includes acquiring, by using the respective parallax images as base images, relative difference information on a relative difference between each of the base images and at least one other parallax image in the multiple parallax images, and detecting an unwanted component contained in each of the parallax images by using the relative difference information.

13 Claims, 14 Drawing Sheets

(51) Int. Cl.
*H04N 13/00* (2018.01)
*H04N 13/02* (2006.01)

(52) U.S. Cl.
CPC .............. *H04N 13/0217* (2013.01); *G06T 2207/10021* (2013.01); *H04N 13/0232* (2013.01); *H04N 2013/0092* (2013.01)

(58) Field of Classification Search
USPC ............................................... 348/47
See application file for complete search history.

(56) References Cited

U.S. PATENT DOCUMENTS

| | | | |
|---|---|---|---|
| 9,185,389 B2 | 11/2015 | Aoki | |
| 2003/0026474 A1* | 2/2003 | Yano | G02B 27/2214 382/154 |
| 2006/0187312 A1* | 8/2006 | Labaziewicz | H04N 5/225 348/218.1 |
| 2008/0024595 A1* | 1/2008 | Garcia Galarriaga | G02B 27/2264 348/46 |
| 2009/0235542 A1 | 9/2009 | Miyazaki et al. | |
| 2011/0169919 A1* | 7/2011 | Karaoguz | H04N 13/0029 348/46 |
| 2011/0193875 A1 | 8/2011 | Saigo | |
| 2011/0235066 A1 | 9/2011 | Sakuragi | |
| 2012/0300041 A1* | 11/2012 | Hamashima | G03B 35/08 348/49 |
| 2013/0135448 A1* | 5/2013 | Nagumo | H04N 13/0203 348/49 |
| 2013/0141539 A1* | 6/2013 | Awazu | G03B 9/02 348/46 |
| 2013/0169751 A1* | 7/2013 | Hattori | H04N 13/0048 348/43 |
| 2013/0194387 A1* | 8/2013 | Hatakeyama | H04N 5/3572 348/46 |
| 2014/0071132 A1 | 3/2014 | Noshi et al. | |
| 2014/0168394 A1 | 6/2014 | Shimoyama et al. | |
| 2014/0340400 A1 | 11/2014 | Takeguchi et al. | |
| 2015/0256734 A1 | 9/2015 | Fukuhara | |
| 2016/0014397 A1 | 1/2016 | Konno et al. | |

FOREIGN PATENT DOCUMENTS

| | | |
|---|---|---|
| JP | 2008-054206 A | 3/2008 |
| JP | 2011-205531 A | 10/2011 |
| JP | 2013115532 A | 6/2013 |
| JP | 2013179564 A | 9/2013 |
| WO | 2013031349 A1 | 3/2013 |

OTHER PUBLICATIONS

Office Action issued in Korean Appln. No. 10-2014-0173626 dated Aug. 2, 2017.
Office Action issued in Korean Appln. No. 10-2014-0173626, dated Sep. 23, 2016.
Office Action issued in Chinese Appln. No. 201410741021.9 dated Jun. 22, 2016.
Non-Final Office Action issued in U.S. Appl. No. 14/564,683 dated Sep. 19, 2016.
Notice of Allowance issued in U.S. Appl. No. 14/564,683 dated Feb. 23, 2017.

* cited by examiner

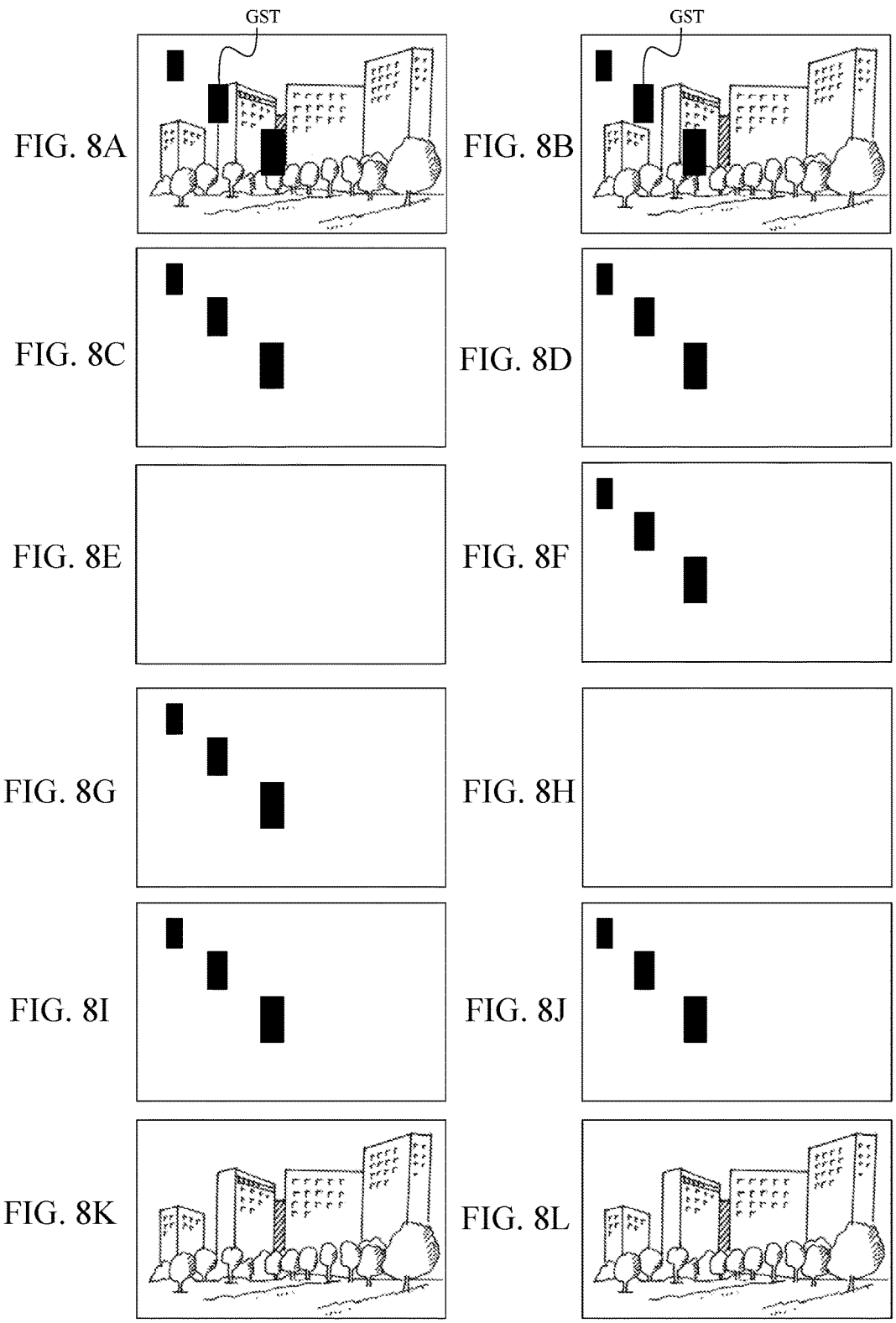

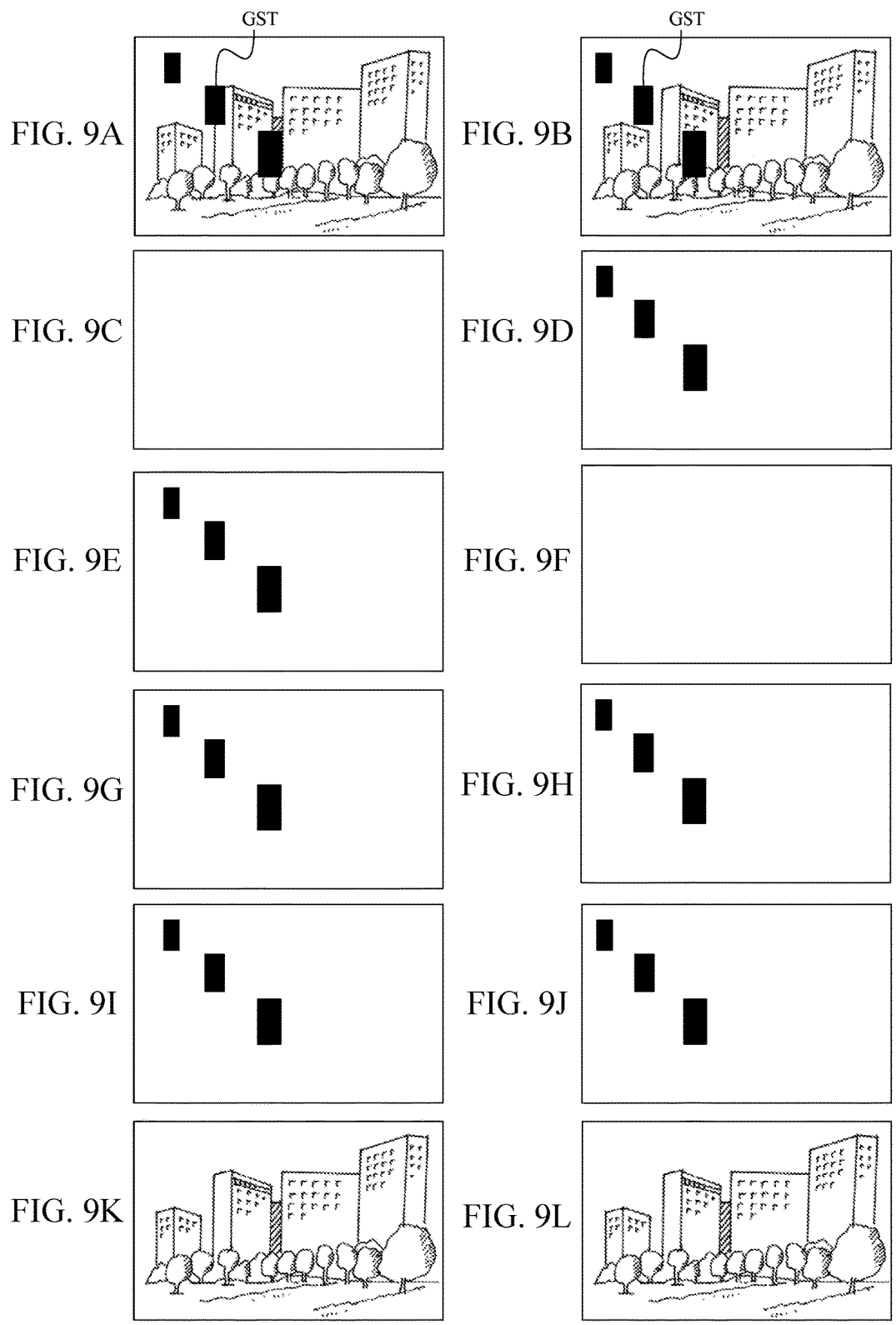

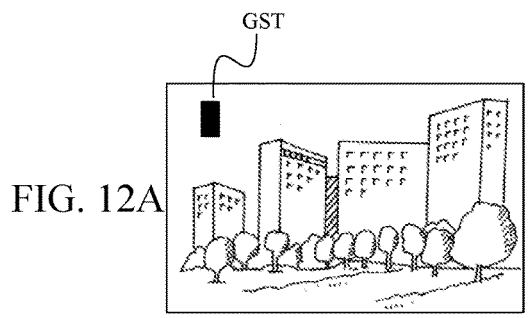
FIG. 12A
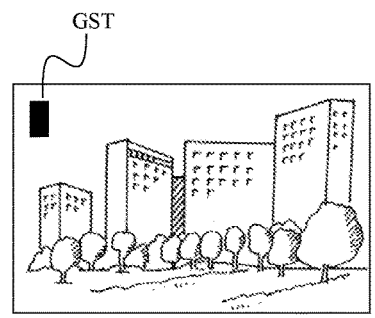
FIG. 12B

FIG. 12H
FIG. 12I
FIG. 12J

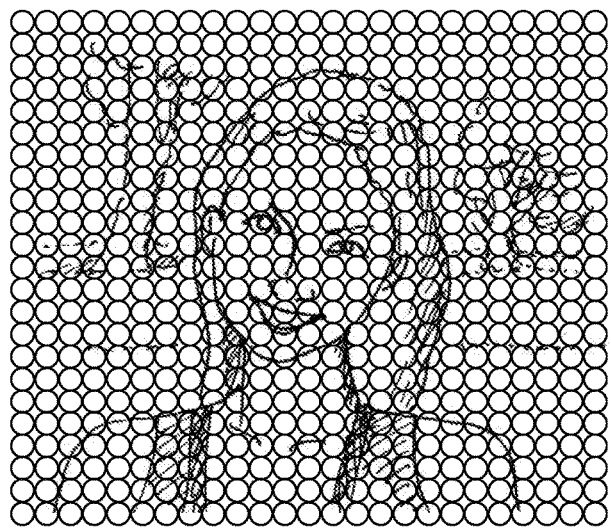
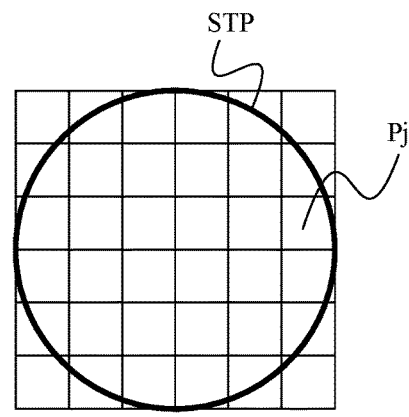
FIG. 17A  FIG. 17B
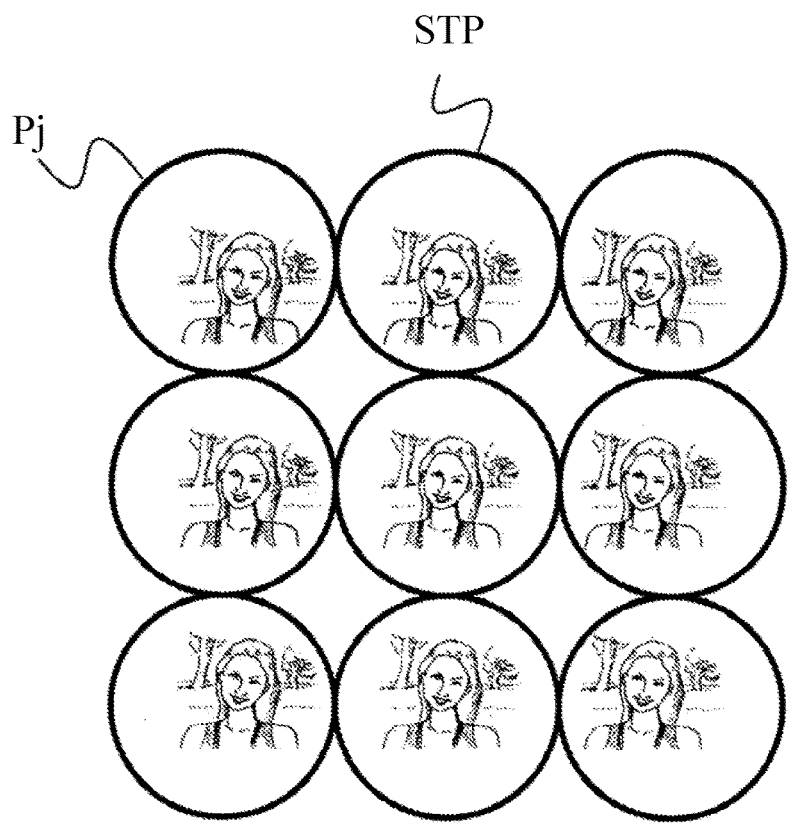
FIG. 18

IMAGE PROCESSING METHOD, IMAGE PROCESSING APPARATUS, IMAGE CAPTURING APPARATUS AND NON-TRANSITORY COMPUTER-READABLE STORAGE MEDIUM

BACKGROUND OF THE INVENTION

Field of the Invention

The present invention relates to an image processing technique to improve quality of a captured image.

Description of the Related Art

In image capturing by using an image capturing apparatus such as a camera, part of light entering an image capturing optical system may be reflected by a lens surface or a lens holder and may consequently reach an image pickup plane as an unwanted light. The unwanted light that has reached the image pickup plane forms a high-density spot image and broadly covers an object image, thereby becoming ghost or flare. The ghost and the flare each appear as an unwanted component in a captured image.

On the other hand, use of a diffractive optical element with a lens located closest to an object side in a telephoto lens in order to correct axial (longitudinal) chromatic aberration and chromatic aberration of magnification may result in a blurred unwanted light appearing in an entire part of a captured image due to light emitted from a high-luminance object such as the sun existing out of an image-capturing field angle and hitting the diffractive optical element. The unwanted light in this case also appears as the unwanted component in the captured image.

To avoid this problem, methods of optically reducing the unwanted light and methods of removing the unwanted component by digital image processing have been conventionally proposed. As one of the latter methods, Japanese Patent Laid-Open No. 2008-54206 discloses a method of detecting ghost from a difference image indicating a difference between an image (in-focus image) provided through an image capturing optical system is in an in-focus state with respect to an object and another image (defocus image) provided through the image capturing optical system is in an out-of-focus state with respect to the object. In addition, as another one of the latter methods, Japanese Patent Laid-Open No. 2011-205531 discloses a method of comparing multiple viewpoint images provided by three-dimensional image capturing through a single lens and thereby detecting ghost.

However, the method disclosed in Japanese Patent Laid-Open No. 2008-54206 requires the image capturing in the in-focus state and the image capturing in the out-of-focus state, namely, multiple-time image capturing, and thus is not suitable for still image capturing of a moving object and for motion image capturing.

On the other hand, the method disclosed in Japanese Patent Laid-Open No. 2011-205531 can provide multiple parallax images by one-time three-dimensional image capturing through the single lens and thus can be used in the still image capturing of the moving object and in the motion image capturing. However, the method disclosed in Japanese Patent Laid-Open No. 2011-205531 only uses a difference of two images that are a main image and a sub image as the viewpoint images to be compared to detect the ghost, thereby decreasing a ghost detection effect in a case where there are viewpoint images captured from three or more viewpoints.

SUMMARY OF THE INVENTION

The present invention provides an image processing method, an image processing apparatus and an image capturing apparatus, each of which can detect an unwanted component contained in multiple parallax images (especially, three or more viewpoint images) with good accuracy without performing multiple-time image capturing.

The present invention provides as an aspect thereof an image processing method including acquiring multiple parallax images produced by image capturing of an object, the parallax images having a parallax to one another, acquiring, by using the respective parallax images as base images, relative difference information on a relative difference between each of the base images and at least one other parallax image in the multiple parallax images, and detecting an unwanted component contained in each of the parallax images by using the relative difference information.

The present invention provides as another aspect thereof an image processing apparatus including an image acquirer configured to acquire multiple parallax images produced by image capturing of an object, the parallax images having a parallax to one another, a detector configured to acquire, by using the respective parallax images as base images, relative difference information on a relative difference between each of the base images and at least one other parallax image in the multiple parallax images and to detect an unwanted component contained in each of the parallax images by using the relative difference information.

The present invention provides as still another aspect thereof an image capturing apparatus including an image capturer configured to produce, by image capturing of an object, multiple parallax images having a parallax to one another, and the above image processing apparatus.

The present invention provides as yet another aspect thereof a non-transitory computer-readable storage medium storing a computer program to cause a computer to execute an image process. The image process included acquiring multiple parallax images produced by image capturing of an object, the parallax images having a parallax to one another, acquiring, by using the respective parallax images as base images, relative difference information on a relative difference between each of the base images and at least one other parallax image in the multiple parallax images, and detecting an unwanted component contained in each of the parallax images by using the relative difference information.

The present invention provides as yet still another aspect thereof an image processing method including acquiring multiple parallax images produced by image capturing of an object, the parallax images having a parallax to one another, and detecting, from a target image that is each of the multiple parallax images, an image component not contained in at least one other parallax image in the multiple parallax images as an unwanted component contained in the target image.

The present invention provides as further another aspect thereof an image processing apparatus including an image acquirer configured to acquire multiple parallax images produced by image capturing of an object, the parallax images having a parallax to one another, and a detector configured to detect, from a target image that is each of the multiple parallax images, an image component not contained in at least one other parallax image in the multiple parallax images as an unwanted component contained in the target image.

The present invention provides as still further another aspect thereof an image capturing apparatus including an image capturer configured to produce, by image capturing of an object, multiple parallax images having a parallax to one another, and the above image processing apparatus.

The present invention provides as yet still further another aspect thereof a non-transitory computer-readable storage medium storing a computer program to cause a computer to execute an image process. The image process includes acquiring multiple parallax images produced by image capturing of an object, the parallax images having a parallax to one another, and detecting, from a target image that is each of the multiple parallax images, an image component not contained in at least one other parallax image in the multiple parallax images as an unwanted component contained in the target image.

Other aspects of the present invention will become apparent from the following description and the attached drawings.

BRIEF DESCRIPTION OF THE DRAWINGS

FIGS. 8A to 8L illustrate a procedure of the image processing method of Embodiment 2.

FIGS. 9A to 9L illustrate another procedure of the image processing method of Embodiment 2.

FIGS. 12A to 12L illustrate another procedure of the image processing method of Embodiment 3.

FIGS. 17A and 17B illustrate an image provided by the image capturing system illustrated in FIG. 15A.

FIG. 18 illustrates images provided by the image capturing system illustrated in FIGS. 14 and 15B.

DESCRIPTION OF THE EMBODIMENTS

Exemplary embodiments of the present invention will be described below with reference to the attached drawings.

Embodiment 1

An image capturing apparatus capable of producing multiple parallax images to be used in each embodiment of the present invention includes an image capturer configured to introduce light fluxes passing through mutually different areas of a pupil of an image capturing optical system to mutually different light receivers (pixels) provided on an image sensor and photoelectrically converting the light fluxes.

Figure 3A:
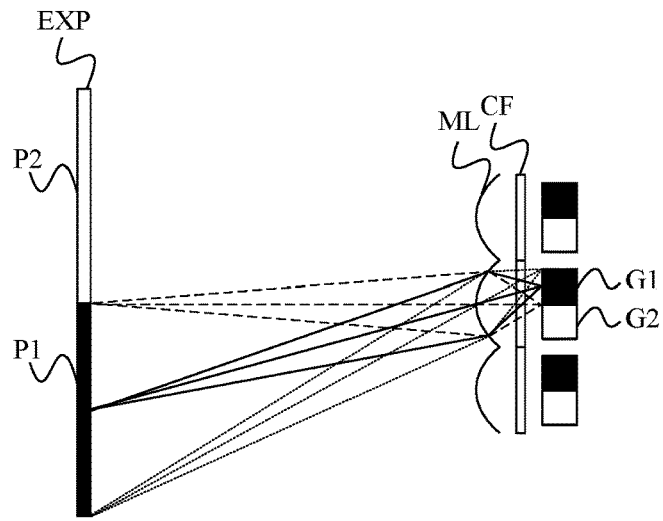
FIGS. 3A and 3B illustrates a relation between light receivers of an image sensor and a pupil of an image capturing optical system in an image capturing apparatus that uses the image processing method of Embodiment 1.

FIG. 3A illustrates a relation, in the image capturer, between the light receivers of the image sensor and the pupil of the image capturing optical system. In FIG. 3A, symbol ML denotes a microlens, CF a color filter, and EXP an exit pupil of the image capturing optical system. Symbols G1 and G2 denote the light receivers (hereinafter respectively referred to as "a pixel G1" and "a pixel G2"). One pixel G1 and one pixel G2 are paired pixels. The paired pixels G1 and G2 (pixel pairs or pixel groups) is plurally arranged on the image sensor. Each paired pixels G1 and G2 have a conjugate relationship with the exit pupil EXP via the microlens ML common to them (that is, each microlens ML is provided for each pixel pair). The multiple pixels G1 disposed on the image sensor are collectively referred to also as "a G1 pixel group", and similarly, the multiple pixels G2 disposed on the image sensor are collectively referred to also as "a G2 pixel group".

Figure 3B:
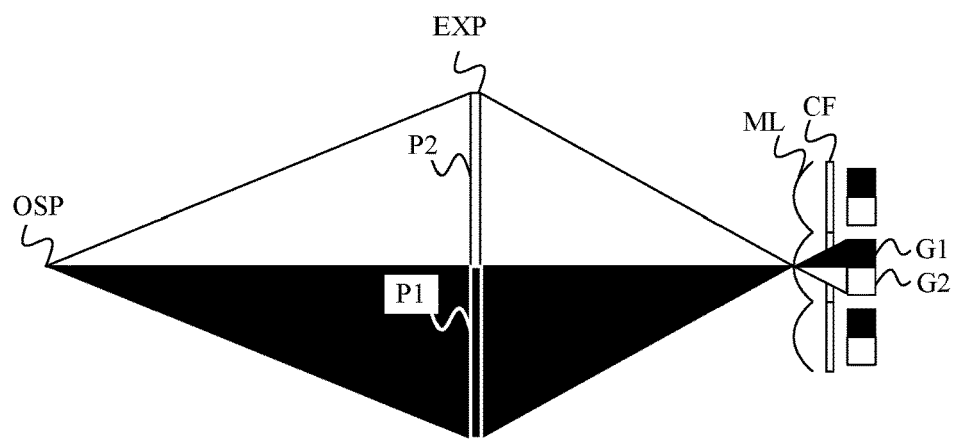

FIG. 3B schematically illustrates the image capturer, when assuming that a thin lens is disposed at a position of the exit pupil EXP instead of the microlens ML illustrated in FIG. 3A. The pixel G1 receives the light flux passing through an area P1 of the exit pupil EXP, and the pixel G2 receives the light flux passing through an area P2 of the exit pupil EXP. Symbol OSP denotes an object point on which image capturing is performed. It is not necessarily needed that an object be present at the object point OSP. The light flux passing through the object point OSP enters the pixel G1 or the pixel G2 depending on the area (position) in the pupil through which the light flux passes. The passing of the light fluxes through the mutually different areas in the pupil corresponds to separation of an entering light from the object point OSP depending on entering angles (parallax). That is, an image produced using an output signal from the pixel G1 provided for the microlens ML and an image produced using an output signal from the pixel G2 provided for the same microlens ML constitute multiple (in FIG. 3B, paired) parallax images having a parallax to each other. In the following description, receiving the light fluxes passing through the mutually different areas in the pupil by the mutually different light receivers (pixels) is referred to also as "pupil division".

In addition, in FIGS. 3A and 3B, multiple images provided when, due to a positional shift of the exit pupil EXP or the like, the above-described conjugation relation becomes imperfect or the areas P1 and P2 partially overlap each other are considered as the parallax images in each embodiment.

Figure 4:
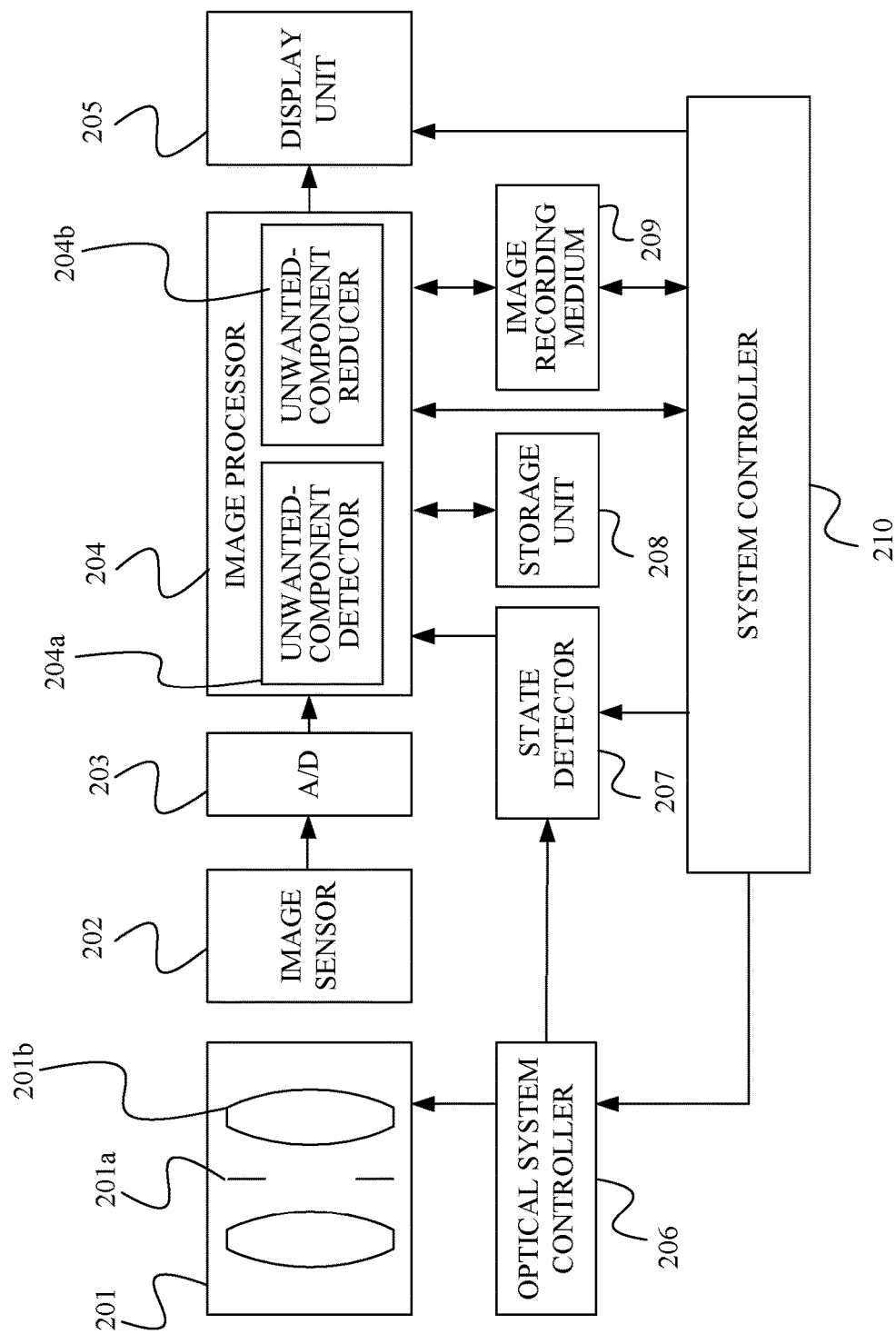
FIG. 4 is a block diagram illustrating a configuration of the image capturing apparatus of Embodiment 1.

FIG. 4 illustrates a basic configuration of the image capturing apparatus that uses an image processing method that is Embodiment 1 of the present invention. An image capturing optical system 201 including an aperture stop 201a and a focus lens 201b causes light from an object (not illustrated) to form an object image on an image sensor 202. The image sensor 202 constituted by a photoelectric conversion element such as a CCD sensor and a CMOS sensor performs the pupil division described using FIGS. 3A and 3B by receiving light fluxes passing through mutually different areas in an exit pupil of the image capturing optical system 201 by pixels (light receivers) thereon corresponding to the areas.

An analog electrical signal produced by the photoelectric conversion of the image sensor 202 is converted by an A/D converter 203 into a digital signal, and the digital signal is then input to an image processor 204. The image processor 204 performs image processes that are commonly performed on the digital signal to produce captured images (in this embodiment, multiple parallax images having a parallax to one another). The image processor 204 corresponds to an image processing apparatus provided in the image capturing apparatus. The image processor 204 serves as an image acquirer that acquires the parallax images. In addition, the image processor 204 includes an unwanted component detector 204a that detects, in each of the parallax images, an unwanted image component (hereinafter simply referred to as "an unwanted component") generated due to an unwanted light described later. The image processor 204 further includes an unwanted-component reducer 204b that performs a correction process to reduce (remove) the detected unwanted component from each of the parallax images.

Output captured images processed by the image processor 204 are stored in an image recording medium 209 such as a semiconductor memory or an optical disk. The output images may be displayed on a display unit 205.

A system controller 210 controls the photoelectric conversion of the image sensor 202, the processes performed by the image processor 204 and operation of the image capturing optical system 201 (the aperture stop 201a and the focus lens 201b). An optical system controller 206 controls mechanical drive of the aperture stop 201a and the focus lens 201b included in the image capturing optical system 201, in response to a control instruction from the system controller 210. An aperture diameter of the aperture stop 201a is controlled corresponding to a set aperture value (F-number). Position of the focus lens 201b is controlled by an autofocus (AF) system or a manual focus mechanism (not illustrated) in order to perform focusing depending on an object distance. A state detector 207 acquires, in response to an instruction from the system controller 210, image capturing condition information showing a state at that point (current state) of the image capturing optical system 201 (such as the position of the focus lens 201b, the aperture value, and a focal length of the image capturing optical system 201 when it is a zoom lens). Although the image capturing optical system 201 is integrally provided to the image capturing apparatus in FIG. 4, it may alternatively be an interchangeable image capturing optical system similarly to that included in a single reflex camera system.

Figure 5A:
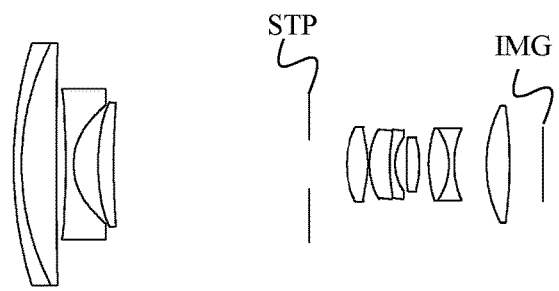
FIGS. 5A to 5C explain the image capturing optical system and an unwanted light generated therein.
Figure 5B:
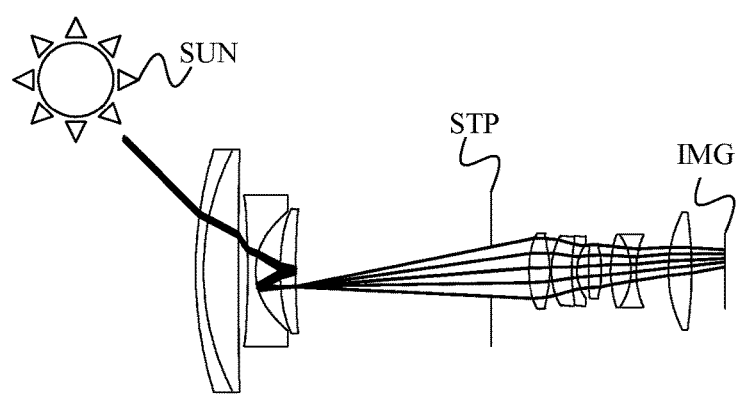

FIG. 5A illustrates an example of a specific configuration of the image capturing optical system 201. Symbol STP denotes the aperture stop 201a. Symbol IMG denotes an image pickup plane at which the image sensor 202 illustrated in FIG. 4 is disposed. FIG. 5B illustrates a situation in which an intense light from the sun denoted by symbol SUN, as an example of a high-luminance object, enters the image capturing optical system 201 and the light reflected by a surface of each lens constituting the image capturing optical system 201 reaches the image pickup plane IMG as the above-mentioned unwanted light (i.e., ghost or flare).

Figure 5C:
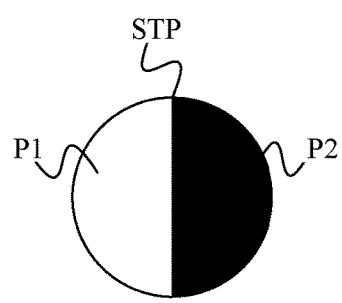

FIG. 5C illustrates, of the aperture stop STP (or the exit pupil of the image capturing optical system 201), the areas (hereinafter referred to as "pupil areas") P1 and P2 through which the light fluxes respectively entering the pixel G1 and the pixel G2 illustrated in FIGS. 3A and 3B pass. Unlike the light flux from the high-luminance object passing through approximately overall area of the aperture stop STP, the light fluxes respectively entering the pixel G1 and the pixel G2 pass through the divided pupil areas P1 and P2.

Next, description will be made of a method of detecting, in each of captured images produced by image capturing performed by the above-described image capturing apparatus, the unwanted component that appears due to the photoelectric conversion of the unwanted light, with reference to FIGS. 1A to 1F and FIGS. 2A and 2B.

Figure 2A:
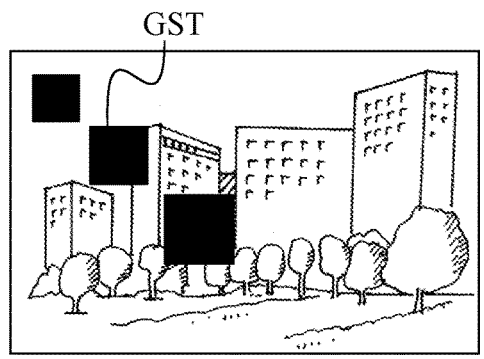
FIGS. 2A and 2B illustrate examples of output images provided by the image processing method that is Embodiment 1 of the present invention.

FIG. 2A illustrates the captured image produced by image capturing in which the pupil division is not performed. In this captured image, buildings and their surrounding trees are included as objects. Symbol GST drawn as black rectangular portions in the captured image denotes the unwanted component that is an image component of the unwanted light (ghost and flare). Although the unwanted component GST is black-filled in FIG. 2A, the objects are actually seen to some extent through the unwanted component GST. In addition, the unwanted component GST is a generated by the unwanted light covering an object image to be captured, so that the unwanted component GST has a higher luminance than that of the object image. This applies to drawings illustrating other embodiments described later.

Figure 1A:
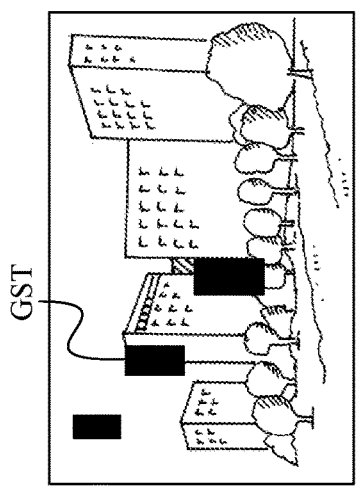
FIGS. 1A to 1F illustrates a procedure of an image processing method that is Embodiment 1 of the present invention.
Figure 1C:
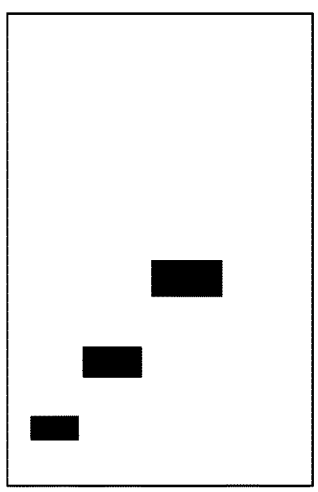
Figure 1E:
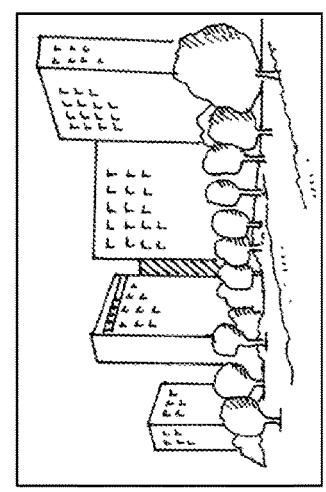
Figure 1B:
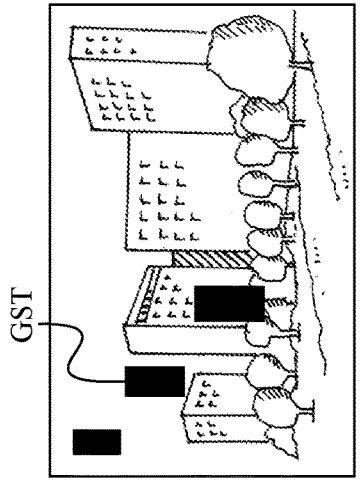

FIGS. 1A and 1B illustrate paired parallax images provided as a result of the photoelectric conversion of the light fluxes passing through the pupil areas P1 and P2 by the G1 and G2 pixel groups. Object image components contained in the paired parallax images provided by image capturing of a close-distance object clearly have a difference (hereinafter referred to as "an object parallax component") corresponding to the parallax. However, object parallax components contained in the paired parallax images provided by image capturing of a far-distance object such as scenery illustrated in FIGS. 1A and 1B have an extremely small amount of the object parallax component. In addition, although the unwanted components GST schematically drawn as the black rectangles are contained also in the paired parallax images, their positions are different in the paired parallax images. Although FIGS. 1A and 1B show an example in which the unwanted components GST do not overlap one another and thus are separate from one another, they may overlap each other and have a luminance difference. That is, it is enough that the unwanted components each drawn as the black rectangles have mutually different positions and luminances.

FIG. 1C illustrates an image provided by subtracting, from the image of FIG. 1A as a base image which is one of the paired parallax images illustrated in FIGS. 1A and 1B, the image of FIG. 1B as a subtracted image which is the other of the paired parallax images. The image (hereinafter referred to as "a relative difference image") indicating a difference between the base image and the subtracted image contains the above-mentioned object parallax component and unwanted component as two-dimensional data of the difference between the paired parallax images (the two-dimensional data is hereinafter referred to as "relative difference information"). However, since the amount of the object parallax component contained in the paired parallax images provided by image capturing of the far-distance object such as scenery is extremely small as described above, an influence of the object parallax component can be mostly disregarded. Furthermore, the difference calculation that subtracts the subtracted image of FIG. 1B from the base image of FIG. 1A calculates the unwanted component included in FIG. 1B as a negative value. However, in this embodiment, in order to simplify an unwanted-component reduction process performed in a subsequent stage, the negative value is discarded (that is, the negative value is regarded as a zero value) in FIG. 1C. This means that the relative difference image of FIG. 1C shows only the unwanted component contained in the base image of FIG. 1A.

Figure 1D:
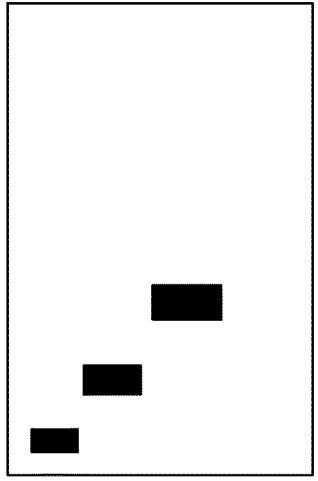

Similarly, FIG. 1D illustrates an image provided by subtracting, from the image of FIG. 1B as a base image, the image of FIG. 1A as a subtracted image, the provided image indicating relative difference information as two-dimensional data. Similarly to the image of FIG. 1C, although the above-mentioned difference calculation calculates the unwanted component included in FIG. 1A as a negative value, the negative value is discarded in FIG. 1D in order to simplify the unwanted-component reduction process. This means that the relative difference information illustrated in FIG. 1D shows only the unwanted component included in FIG. 1B. As described above, performing a process that leaves (in other words, separates or extracts) only the unwanted component in the relative difference image provided by subtracting, from one (base image) of the paired parallax images, the other (subtracted image) enables detecting the unwanted component.

Figure 1F:
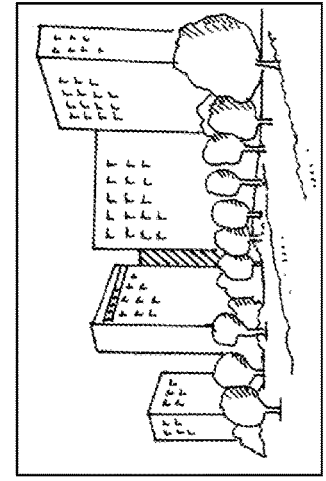
Figure 2B:
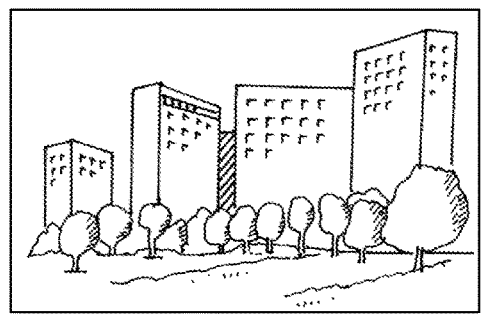

Thereafter, the correction process that removes (or reduces) the unwanted components of FIGS. 1C and 1D detected as described above is performed on the original parallax images of FIGS. 1A and 1B. This correction process enables providing parallax images as paired output images whose unwanted components have been reduced (mostly removed) as illustrated in FIGS. 1E and 1F. Furthermore, combining the paired parallax images whose unwanted components have been reduced enables, as illustrated in FIG. 2B, producing a combined image which is equivalent to a captured image produced by image capturing in which the pupil division is not performed and which contains almost no unwanted component.

Figure 6:
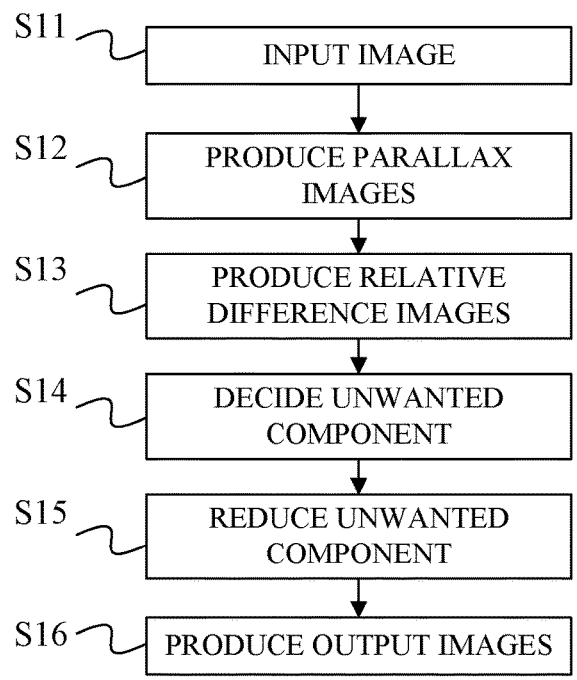
FIG. 6 is a flowchart illustrating a procedure of the image processing method of Embodiment 1.

FIG. 6 is a flowchart illustrating a procedure for the above-described unwanted-component detection/reduction process (image process). This process is performed by the system controller 210 and the image processor 204 (the unwanted-component detector 204a and the unwanted-component reducer 204b), each of which is a computer, according to an image processing program as a computer program.

At step S11, the system controller 210 controls the image capturer constituted by the image capturing optical system 201 and the image sensor 202 to perform image capturing of an object.

Next, at step S12, the system controller 210 causes the image processor 204 to produce paired parallax images as input images by using a signal output from the image sensor 202 (the G1 and G2 pixel groups) and digitalized by the A/D converter 203. At this step, the image processor 204 may perform a normal development process and various image correction processes to produce the parallax images.

Next, at step S13, the unwanted-component detector 204a acquires relative difference information of the paired parallax images. That is, the unwanted-component detector 204a produces a relative difference image (FIG. 1C) by using the parallax image of FIG. 1A as the base image and using the parallax image of FIG. 1B as the subtracted image, and produces another relative difference image (FIG. 1D) by using the parallax image of FIG. 1B as the base image and the parallax image of the FIG. 1A as the subtracted image. When light fluxes of the unwanted light reaching the image pickup plane pass through mutually different pupil areas of the image capturing optical system, positions at which the unwanted components are generated are different in the respective parallax images as illustrated in FIGS. 1A and 1B. For this reason, in a simple relative difference image, the unwanted component has a positive or negative difference value. For instance, when the subtracted image illustrated in FIG. 1B is subtracted from the base image illustrated in FIG. 1A in order to produce the relative difference image illustrated in FIG. 1C, the unwanted component contained in the base image has a positive value, and the unwanted component contained in the subtracted image has a negative value. In this embodiment, in order to simplify the unwanted-component reduction process subsequently performed, the above-described process is performed which discards the negative value to cause it to become the zero value (i.e., the negative value is regarded as the zero value). This process results in detection of only the positive-value unwanted component contained in the base image of FIG. 1A from the relative difference image illustrated in FIG. 1C. Conversely, when the subtracted image illustrated in FIG. 1A is subtracted from the base image illustrated in FIG. 1B to produce the relative difference image illustrated in FIG. 1D, only a positive-value unwanted component contained in the base image of FIG. 1B is detected from the relative difference image.

In addition, in acquiring the relative difference information for the parallax images provided by image capturing of a close-distance object, a process for position matching of these paired parallax images in order to remove their object parallax components may be performed. The position matching can be performed by shifting, with respect to one of the paired parallax images, position of the other thereof and deciding its shift position at which a correlation between these paired parallax images becomes maximum. The position matching can alternatively be performed by deciding a shift position of the other parallax image at which a square sum of differences between the parallax images becomes minimum. Furthermore, in-focus areas in the parallax images may be selected as references in deciding the shift position used for the position matching. Moreover, the shift position may be decided by detecting an edge in each of the parallax images in advance and then using an image showing the detected edge. This method detects a high-contrast edge in an in-focus area and is less likely to detect a low-contrast edge in an out-of-focus area such as a background, so that the method necessarily decides the shift position with an emphasis on the in-focus area.

Next, at step S14, the unwanted-component detector 204a decides each component left in the relative difference image acquired at step S13 as the unwanted component. The unwanted component contained in each of the original parallax images is thus detected.

Furthermore, at step S15, the unwanted-component reducer 204b performs the correction process that removes the unwanted component from each of the original parallax images to produce paired parallax images as output images. In this embodiment, the unwanted-component reducer 204b produces, as the output images, the parallax image (FIG. 1E) whose pixels are each constituted by an image signal acquired from the output signal from each pixel G1 of the image sensor 202 and the parallax image (FIG. 1F) whose pixels are each constituted by an image signal acquired from the output signal from each pixel G2 thereof. At above-described step S13, the negative value has been discarded and thereby regarded as the zero value, so that only the positive-value unwanted component contained in each of the parallax images has been detected. Therefore, simply subtracting the relative difference image from each of the parallax images at step S15 enables reducing (removing) the unwanted component. That is, the subtraction of the relative difference image of FIG. 1C from the parallax image of FIG. 1A and the subtraction of the relative difference image of FIG. 1D from the parallax image of FIG. 1B provides the paired parallax images to be output.

Finally, at step S16, the system controller 210 stores, to the image recording medium 209, the output images (paired parallax images) whose unwanted components illustrated in FIGS. 1E and 1F have been reduced (removed) and displays them on the display unit 205. Moreover, it is also possible, by combining the paired parallax images as the output images, to output, as illustrated in FIG. 2B, a combined image which is equivalent to a captured image produced by image capturing in which the pupil division is not performed and whose unwanted component has been sufficiently reduced.

As described above, this embodiment uses each one of the two parallax images provided by one-time image capturing as the base image and enables, by using the relative difference (relative difference information) between each of the base images and the other parallax image, detecting the unwanted component contained in each of the parallax images (base images). That is, the image processing method of this embodiment can detect the unwanted components contained in the captured images without performing multiple-time image capturing. Furthermore, this embodiment discards the unwanted component that becomes the negative value in producing the relative difference information, and therefore enables detecting the unwanted component that becomes the positive value therein with a simple difference calculation. This makes it possible to provide a high-quality image whose unwanted component has been sufficiently reduced (removed) merely by subtracting the unwanted component from each of the original parallax images.

Embodiment 2

Figures 7A, 7B:
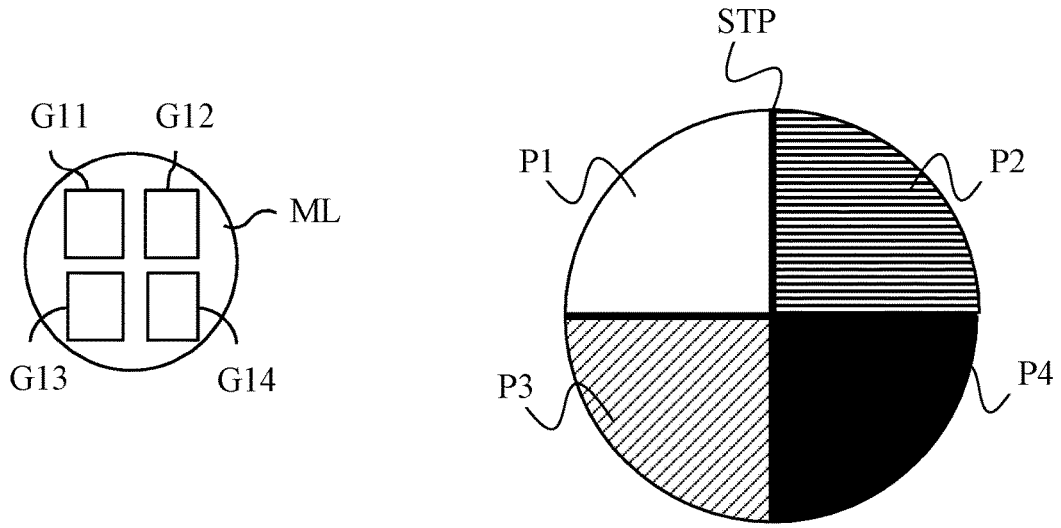
FIGS. 7A and 7B explain the light receivers of the image sensor and an unwanted light passing through an aperture stop of the image capturing optical system in the image capturing apparatus that uses an image processing method that is Embodiment 2 of the present invention.

Next, description will be made of an image capturing apparatus that is a second embodiment (Embodiment 2) of the present invention. The image capturing apparatus performs multiple pupil division. Basic configurations of the image capturing apparatus and the image capturing optical system 201 in this embodiment are same as those shown in Embodiment 1 (FIG. 4). FIG. 7A illustrates light receivers of an image sensor included in an image capturer of the image capturing apparatus of this embodiment. In FIG. 7A, symbol ML denotes a microlens. Symbols G11, G12, G13 and G14 denote the light receivers (hereinafter respectively referred to as "a pixel G11", "a pixel G12", "a pixel G13" and "a pixel G14") constituting a pixel group. On the image sensor, the pixel group constituted by the pixels G11, G12, G13 and G14 is plurally arranged. Each pixel group has a conjugate relation with the exit pupil EXP via the microlens ML common to the pixel group (that is, each microlens ML is provided for each pixel group). A plurality of the pixels G11, a plurality of the pixels G12, a plurality of the pixels G13 and a plurality of the pixels G14 constituting the pixel groups arranged on the image sensor are each collectively referred to also as "a G1 pixel group", "a G2 pixel group", "a G3 pixel group" and "a G4 pixel group".

FIG. 7B illustrates, of an aperture stop STP (or an exit pupil of the image capturing optical system), pupil areas P1, P2, P3 and P4 through which light fluxes respectively entering the pixel G11, the pixel G12, the pixel G13 and the pixel G14 illustrated in FIG. 7A pass. Unlike the light flux from a high-luminance object passing through approximately overall area of the aperture stop STP, the light fluxes entering the pixel G11, the pixel G12, the pixel G13 and the pixel G14 pass through the divided pupil areas P1, P2, P3 and P4.

With reference to FIGS. 8A to 8L and 9A to 9L, description will be made of a method of detecting, in each of captured images produced by the above-described image capturing apparatus, the unwanted component that is the image component that appears as the result of the photoelectric conversion of the above-mentioned unwanted light.

Also in this embodiment, the captured image illustrated in FIG. 2A is produced by image capturing in which the pupil division is not performed. FIGS. 8A and 8B and FIGS. 9A and 9B illustrate grouped parallax images provided as a result of the photoelectric conversion of the light fluxes passing through the pupil areas P1, P2, P3 and P4 by the G1 pixel group, the G2 pixel group, the G3 pixel group and the G4 pixel group. The grouped parallax images include the unwanted components GST which are schematically drawn as black rectangles; positions thereof are respectively same between the parallax images illustrated in FIGS. 8A and 9A and between the parallax images illustrated in FIGS. 8B and 9B. On the other hand, the positions of the unwanted components are different between the parallax images illustrated in FIGS. 8A and 8B and between the parallax images illustrated in FIGS. 9A and 9B.

FIG. 8C illustrates a relative difference image indicating relative difference information that is two-dimensional data acquired by a difference calculation that subtracts, from the image of FIG. 8A as a base image, the image of FIG. 8B as a subtracted image. Although an object parallax component and the unwanted component are contained in the relative difference image, it is assumed that an amount of the object parallax component is, similarly to Embodiment 1, extremely small and thereby an influence thereof can be disregarded. Furthermore, similarly to Embodiment 1, although the unwanted component contained in the parallax image of FIG. 8B is calculated as a negative value by the above-described difference calculation, the negative value is discarded and thereby regarded as a zero value in the relative difference image of FIG. 8C in order to simplify an unwanted-component reduction process performed in a subsequent stage (this applies to all the relative difference images described below). This means that the relative difference image of FIG. 8C shows, as the relative difference information, only the unwanted component included in FIG. 8A.

FIG. 8E illustrates a relative difference image indicating relative difference information that is two-dimensional data acquired by a difference calculation that subtracts, from the image of FIG. 8A as the base image, the image of FIG. 9A as a subtracted image. Although an object parallax component is contained in the relative difference image, it is assumed that an amount thereof is extremely small and thereby an influence thereof can be disregarded. In addition, as described above, since the positions of the unwanted components contained in the parallax images of FIG. 8A and FIG. 9A are same as each other, no unwanted component is detected as the relative difference information. As described above, the unwanted components appearing at the same positions do not appear in the relative difference image. That is, there also exists an unwanted component that cannot be detected from only the relative difference information between the two parallax images. However, if, for example, like the parallax image of FIG. 8B, the unwanted component is generated in at least one parallax image at a position different from that in the base image, this embodiment enables effectively detecting the unwanted component by acquiring the relative difference information between the four parallax images.

Furthermore, FIG. 8G illustrates a relative difference image indicating relative difference information that is two-dimensional data acquired by a difference calculation that subtracts, from the image of FIG. 8A as the base image, the image of FIG. 9B as a subtracted image. Since the positions of the unwanted components in the parallax images of FIGS. 8A and 9B are different from each other, the relative parallax image of FIG. 8G shows, similarly to the parallax image of FIG. 8C, only the unwanted component included in the parallax image of FIG. 8A.

FIG. 8I illustrates, when pixel positions in the relative difference images of FIGS. 8C, 8E and 8G which correspond to one another are collectively referred to as "a corresponding pixel position", an image indicating maximum value information acquired by extracting a maximum value of relative differences between the relative difference images (each relative difference image corresponds to the two-dimensional relative difference information) of FIGS. 8C, 8E and 8G at each of their corresponding pixel positions. The maximum value information is hereinafter referred to as "relative difference maximum value information". In this embodiment, the relative difference maximum value information in FIG. 8I has a same value as those of the relative difference information in FIG. 8C and the relative difference information in FIG. 8G, which indicates the position and amount of the unwanted component contained in the parallax image of FIG. 8A.

Similarly, FIG. 8D illustrates a relative difference image indicating relative difference information that is two-dimensional data acquired by a difference calculation that subtracts, from the image of FIG. 8B as a base image, the image of FIG. 8A as a subtracted image. FIG. 8F illustrates a relative difference image indicating relative difference information that is two-dimensional data acquired by a difference calculation that subtracts, from the image of FIG. 8B as the base image, the image of FIG. 9A as a subtracted image. FIG. 8H illustrates a relative difference image indicating relative difference information that is two-dimensional data acquired by a difference calculation that subtracts, from the image of FIG. 8B as the base image, the image of FIG. 9B as a subtracted image. FIG. 8J illustrates an image indicating relative difference maximum value information acquired by extracting a maximum value of relative differences between the relative difference images (each relative difference image corresponds to the two-dimensional relative difference information) of FIGS. 8D, 8F and 8H at each of their corresponding pixel positions. In this embodiment, the relative difference maximum value information in FIG. 8J has a same value as those of the relative difference information in FIG. 8D and the relative difference information in FIG. 8F, which indicates the position and amount of the unwanted component contained in the parallax image of FIG. 8B.

Similarly, FIG. 9C illustrates a relative difference image indicating relative difference information that is two-dimensional data acquired by a difference calculation that subtracts, from the image of FIG. 9A as a base image, the image of FIG. 8A as a subtracted image. FIG. 9E illustrates a relative difference image indicating relative difference information that is two-dimensional data acquired by a difference calculation that subtracts, from the image of FIG. 9A as the base image, the image of FIG. 8B as a subtracted image. FIG. 9G illustrates a relative difference image indicating relative difference information that is two-dimensional data acquired by a difference calculation that subtracts, from the image of FIG. 9A as the base image, the image of FIG. 9B as a subtracted image. FIG. 9I illustrates an image indicating relative difference maximum value information acquired by extracting a maximum value of relative differences between the relative difference images (each relative difference image corresponds to the two-dimensional relative difference information) of FIGS. 9C, 9E and 9G at each of their corresponding pixel positions. In this embodiment, the relative difference maximum value information in FIG. 9I has a same value as those of the relative difference information in FIG. 9E and the relative difference information in FIG. 9G and indicates position and amount of the unwanted component contained in the parallax image of FIG. 9A.

Similarly, FIG. 9D illustrates a relative difference image indicating relative difference information that is two-dimensional data acquired by a difference calculation that subtracts, from the image of FIG. 9B as a base image, the image of FIG. 8A as a subtracted image. FIG. 9F illustrates a relative difference image indicating relative difference information that is two-dimensional data acquired by a difference calculation that subtracts, from the image of FIG. 9B as the base image, the image of FIG. 8B as a subtracted image. FIG. 9H illustrates a relative difference image indicating relative difference information that is two-dimensional data acquired by a difference calculation that subtracts, from the image of FIG. 9B as the base image, the image of FIG. 9A as a subtracted image. FIG. 9J illustrates an image indicating relative difference maximum value information acquired by extracting a maximum value of relative differences between the relative difference images (each relative difference image corresponds to the two-dimensional relative difference information) of FIGS. 9D, 9F and 9H at each of their corresponding pixel positions. In this embodiment, the relative difference maximum value information in FIG. 9J has a same value as those of the relative difference information in FIG. 9D and the relative difference information in FIG. 9H, which indicates the position and amount of the unwanted component contained in the parallax image of FIG. 9B.

Thereafter, as in Embodiment 1, the correction process that removes the unwanted components of FIGS. 8I, 8J, 9I and 9J is performed on the original parallax images of FIGS. 8A, 8B, 9A and 9B. This enables providing parallax images as output images whose unwanted components have been mostly removed as illustrated in FIGS. 8K, 8L, 9K and 9L. Furthermore, combining the parallax images whose unwanted components have been reduced enables producing, as illustrated in FIG. 2B, a combined image which is equivalent to a captured image produced by image capturing in which the pupil division is not performed and which contains almost no unwanted component.

Figure 10:
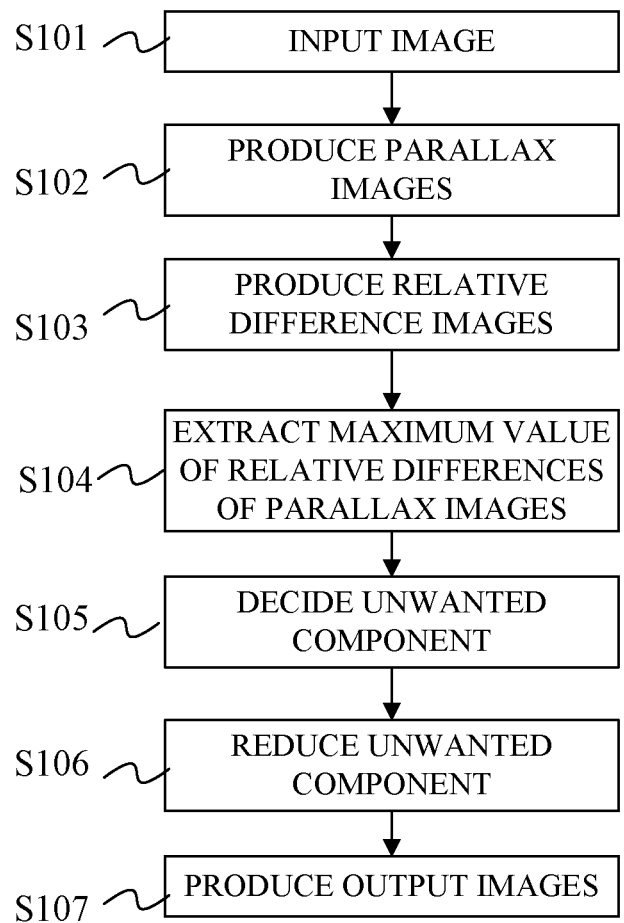
FIG. 10 is a flowchart illustrating the procedure of the image processing method of Embodiment 2.

FIG. 10 is a flowchart illustrating an example of a procedure for an unwanted-component detection/reduction process (image process) in this embodiment.

Steps S101 and S102 are respectively same as steps S11 and S12 of Embodiment 1 (FIG. 6).

At step S103, the unwanted-component detector 204*a* acquires, for the grouped parallax images, relative difference images by using each of the grouped parallax images as the base image. That is, the unwanted-component detector 204*a* produces the images illustrated in FIGS. 8C, 8E and 8G as the relative difference images by using the parallax image of FIG. 8A as the base image. Furthermore, the unwanted-component detector 204a produces the images illustrated in FIGS. 8D, 8F and 8H as the relative difference images by using the parallax image of FIG. 8B as the base image. Similarly, the unwanted-component detector 204a produces the images illustrated in FIGS. 9C, 9E and 9G as the relative difference images by using the parallax image of FIG. 9A as the base image. Furthermore, the unwanted-component detector 204a produces the images illustrated in FIGS. 9D, 9F and 9H as the relative difference images by using the parallax image of FIG. 9B as the base image.

When the light fluxes of the unwanted light reaching the image pickup plane pass through the mutually different pupil areas of the image capturing optical system, the positions at which the unwanted component is generated are different between the parallax images as illustrated in FIGS. 8A and 8B. For this reason, in a simple relative difference image, the unwanted component has a positive or negative difference value. For instance, when the subtracted image illustrated in FIG. 8B is subtracted from the base image illustrated in FIG. 8A in order to produce the relative difference image illustrated in FIG. 8C, the unwanted component contained in the base image has a positive value, and the unwanted component contained in the subtracted image has a negative value. In this embodiment, in order to simplify the unwanted-component reduction process subsequently performed, the above-described process is performed which discards the negative value to cause it to become the zero value (i.e., the negative value is regarded as the zero value). This process results in detection of only the positive-value unwanted component contained in FIG. 8A from the relative difference image illustrated in FIG. 8C. Performing a similar process on each of the other relative difference images results in detection of only the positive-value unwanted component contained in the base image. On the other hand, as illustrated in FIGS. 8A and 9A, when the unwanted components are present at the same positions as each other, no unwanted component is detected from the relative difference image as described above.

Next, at step S104, the unwanted-component detector 204a acquires (extracts) the relative difference maximum value information of each of the corresponding pixel positions in the multiple (four) relative difference images provided at step S103.

The reason for and the effect of acquiring the relative difference maximum value information, which have been mentioned in the description on the image of FIG. 8E, are as follows. The unwanted components contained in the parallax images illustrated in FIGS. 8A and 9A may be present at same positions as each other depending on an optical system used and positions of a high-luminance light source. Also in this embodiment, the unwanted components contained in the parallax images illustrated in FIGS. 8A and 9A are present at the same positions as each other. In such a case, when a difference between the parallax images is calculated, the unwanted component has a zero value. That is, from only the relative difference information between the parallax images, such an unwanted component that cannot be detected is likely to be generated.

To solve this situation, this embodiment acquires the relative difference information between the four parallax images, thereby making it possible to detect the unwanted component that cannot be detected from only the difference information between the two parallax images. That is, when the parallax image of FIG. 8A is regarded as the base image, the unwanted components contained in the base image and the parallax image of FIG. 9A are present at the same positions as each other and thus are not detected. However, the unwanted component is generated in the parallax image of FIG. 8B at a different position from that in the base image and thus can be detected similarly to that contained in the relative parallax image of FIG. 8C.

As described above, acquiring the relative difference information on the relative differences between the base image and the other (three or at least two) parallax images and acquiring the relative difference maximum value information among the relative differences enables detecting the position and amount of the unwanted component contained in at least one parallax image in which the position thereof is different from that in the base image.

Next, at step S105, the unwanted-component detector 204a decides, as the unwanted component, a component left in an image indicating the relative difference maximum value information acquired at step S104 (the image is hereinafter referred to also as "a relative difference maximum value image"). The unwanted components contained in the original parallax images are thus detected.

Next, at step S106, the unwanted-component reducer 204b performs the correction process that removes the unwanted components detected at step S105 from the original parallax images to produce grouped parallax images as output images. In this embodiment, the unwanted-component reducer 204b produces, as the output images, the parallax image (FIG. 8K) whose pixels are each constituted by an image signal acquired from the output signal from each pixel G11 of the image sensor 202 and the parallax image (FIG. 8L) whose pixels are each constituted by an image signal acquired from the output signal from each pixel G12 of the image sensor 202. The unwanted-component reducer 204b further produces the parallax image (FIG. 9K) whose pixels are each constituted by an image signal acquired from the output signal from each pixel G13 and the parallax image (FIG. 9L) whose pixels are each constituted by an image signal acquired from the output signal from each pixel G14.

At above-described step S103, the negative value has been discarded and thereby regarded as the zero value, so that only the positive-value unwanted component contained in each of the parallax images has been detected as the relative difference maximum value information. Therefore, simply subtracting the relative difference maximum value image from each of the parallax images at step S106 enables reducing (removing) the unwanted component. That is, the unwanted-component reducer 204b subtracts the relative difference maximum value image of FIG. 8I from the parallax image of FIG. 8A and subtracts the relative difference maximum value image of FIG. 8J from the parallax image of FIG. 8B. Similarly, the unwanted-component reducer 204b subtracts the relative difference maximum value image of FIG. 9I from the parallax image of FIG. 9A and subtracts the relative difference maximum value image of FIG. 9J from the parallax image of FIG. 9B. This results in the grouped parallax images (FIGS. 8K, 8L, 9K and 9L) as the output images.

Finally, at step S107, the system controller 210 stores the output images (grouped parallax images) whose unwanted components have been reduced (removed), which are illustrated in FIGS. 8K, 8L, 9K and 9L, to the image recording medium 209. In addition, the system controller 210 displays the output images on the display unit 205. Moreover, it is also possible, by combining the grouped parallax images as the output images, to output a combined image, as illustrated in FIG. 2B, which is equivalent to a captured image produced by image capturing in which the pupil division is not performed and whose unwanted component has been sufficiently reduced.

As described above, this embodiment uses each one of the four parallax images provided by one-time image capturing as the base image and enables, by using the relative differences (relative difference information) between each of the base images and the other three parallax image, detecting the unwanted component contained in each of the parallax images (base images). That is, the image processing method of this embodiment can detect the unwanted components contained in the captured images without performing multiple-time image capturing. Furthermore, this embodiment discards the unwanted component that becomes the negative value in producing the relative difference information and therefore enables detecting the unwanted component that becomes the positive value therein with a simple difference calculation. This makes it possible to provide a high-quality image whose unwanted component has been sufficiently reduced (removed) merely by subtracting the unwanted component from each of the original parallax images. Moreover, this embodiment acquires the relative difference maximum value information from the relative differences between the four parallax images. Therefore, even when, for example, the positions of the unwanted components contained in two of the four parallax images are same as each other, a difference between the positions of the unwanted components contained in the other two of the four parallax images makes it possible to detect the unwanted components and to provide the output images in which the unwanted components have been reduced.

This embodiment acquires, by using each one of the four parallax images as the base image, the relative difference information (relative difference images) on the relative differences between each base image and the other three parallax images and detects, by using each parallax image and the relative difference information acquired when using that parallax image as the base image, the unwanted component contained in each of the parallax images. However, it is not necessarily needed to use the four parallax images, and thus two parallax images may be used as described in Embodiment 1 or three or more parallax images may be used. That is, it is enough that one or more relative differences are acquired with respect to each of the multiple parallax images. This applies also to Embodiment 3 described later.

Embodiment 3

Next, description of a third embodiment (Embodiment 3) of the present invention will be made. Basic configurations of an image capturing apparatus and an image capturing optical system 201 in this embodiment are same as those described in Embodiment 1 (FIG. 4). In addition, light receivers of an image sensor included in an image capturer in this embodiment are same as those in Embodiment 2. Furthermore, a relation between an aperture stop STP and pupil areas P1, P2, P3 and P4 through which light fluxes entering pixels G11, G12, G13 and G14 pass is also same as that in Embodiment 2.

Embodiment 2 described the method of detecting the unwanted components similar to one another and contained in the grouped parallax images at different positions from one another. On the other hand, this embodiment will describe a method of detecting, when at least one of the grouped parallax images includes only part of the unwanted component included in another parallax image, the part of the unwanted component.

FIGS. 11A, 11B, 12A and 12B respectively illustrate grouped parallax images provided as a result of photoelectric conversion of light fluxes passing through the pupil areas P1, P2, P3 and P4 by the G1 pixel group, the G2 pixel group, the G3 pixel group and the G4 pixel group. The grouped parallax images contain unwanted components GST schematically drawn as black rectangles in the figures. Part (upper-left part) of the unwanted component GST contained in the parallax image illustrated in FIG. 11A and the unwanted component GST contained in the parallax image illustrated in FIG. 12A are present at same positions as each other. Similarly, part (upper-left part) of the unwanted component GST contained in the parallax image illustrated in FIG. 11B and the unwanted component GST contained in the parallax image illustrated in FIG. 12B are present at same positions as each other. On the other hand, in the parallax images of FIGS. 11A and 11B, the entire unwanted components GST are present at mutually different positions. Similarly, in the parallax images of FIGS. 12A and 12B, the unwanted components GST are present at mutually different positions.

Figure 11A:
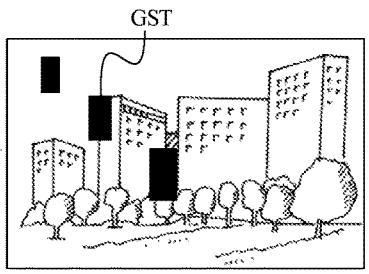
FIGS. 11A to 11L illustrate a procedure of an image processing method that is Embodiment 3 of the present invention.
Figure 11B:
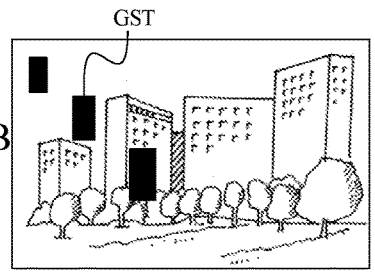
Figure 11C:
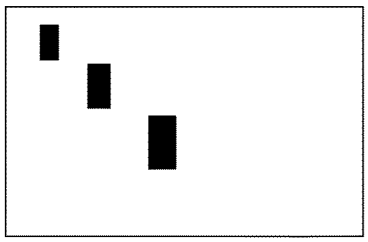

FIG. 11C illustrates a relative difference image indicating relative difference information that is two-dimensional data acquired by a difference calculation that subtracts, from the image of FIG. 11A as a base image, the image of FIG. 11B as a subtracted image. Although an object parallax component and the unwanted component are contained in the relative difference image, it is assumed that an amount of the object parallax component is, similarly to Embodiment 1, extremely small and thereby an influence thereof can be disregarded. Moreover, similarly to Embodiment 1, although the unwanted component contained in the parallax image of FIG. 11B is calculated as a negative value by the above-described difference calculation, the negative value is discarded and thereby regarded as a zero value in the relative difference image of FIG. 11C in order to simplify an unwanted-component reduction process performed in a subsequent stage (this applies to all the relative difference images described below). This means that the relative difference image of FIG. 11C shows, as the relative difference information, only the unwanted component included in FIG. 11A.

Figure 11D:
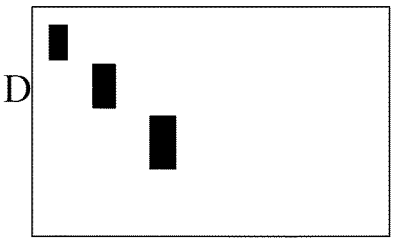
Figure 11E:
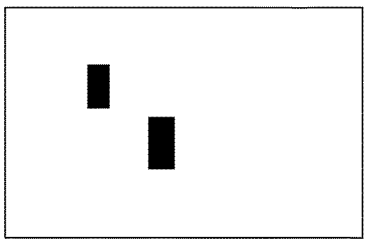

FIG. 11E illustrates a relative difference image indicating relative difference information that is two-dimensional data acquired by a difference calculation that subtracts, from the image of FIG. 11A as the base image, the image of FIG. 12A as a subtracted image. This relative difference image contains, as the relative difference information, an object parallax component and the unwanted component, as well as in Embodiment 1. Since the part of the unwanted component contained in the parallax image of FIG. 11A and the unwanted component contained in the parallax image of FIG. 12A are present at the same positions as each other as described above, the unwanted components (hereinafter referred to as "common unwanted components") present at the same positions as each other are not detected as the relative difference information.

Figure 11F:
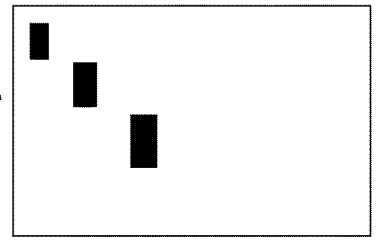
Figure 11G:
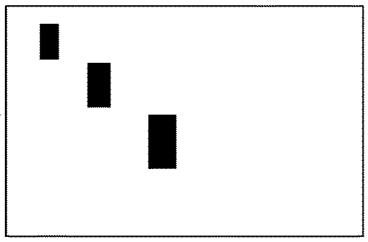

Furthermore, FIG. 11G illustrates a relative difference image indicating relative difference information that is two-dimensional data acquired by a difference calculation that subtracts, from the image of FIG. 11A as the base image, the image of FIG. 12B as a subtracted image. Since the positions of the unwanted components in the parallax images of FIGS.

11A and 12B are different from each other, the relative parallax image of FIG. 11G shows, similarly to the parallax image of FIG. 11C, only the unwanted component included in the parallax image of FIG. 11A.

Figure 11H:
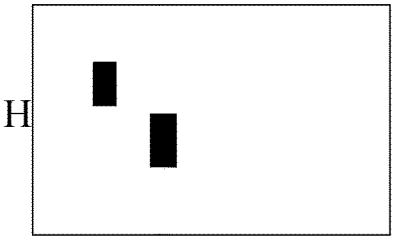
Figure 11I:
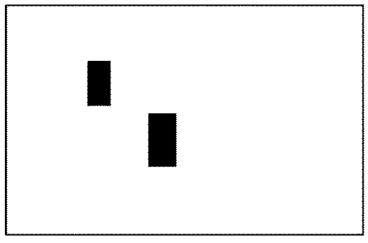

FIG. 11I illustrates an image indicating relative difference minimum value information acquired by extracting a minimum value of relative differences between the relative difference images (each relative difference image corresponds to the two-dimensional relative difference information) of FIGS. 11C, 11E and 11G at each of their corresponding pixel positions. In this embodiment, the relative difference minimum value information in FIG. 11I has a same value as that of the relative difference information in FIG. 11E, which indicates the position and amount of part of the unwanted component contained in the parallax image of FIG. 11A. In the following description, the image showing the relative difference minimum value information is referred to also as "a relative difference minimum value image".

Figure 11J:
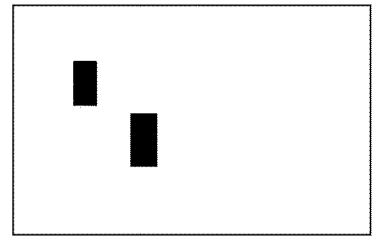
Figure 11K:
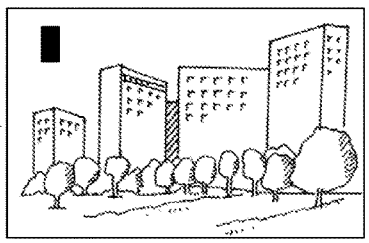
Figure 11L:
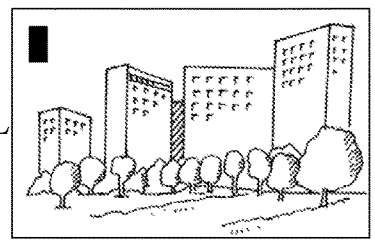

Similarly, FIG. 11D illustrates a relative difference image indicating relative difference information that is two-dimensional data acquired by a difference calculation that subtracts, from the image of FIG. 11B as a base image, the image of FIG. 11A as a subtracted image. FIG. 11F illustrates a relative difference image indicating relative difference information that is two-dimensional data acquired by a difference calculation that subtracts, from the image of FIG. 11B as the base image, the image of FIG. 12A as a subtracted image. FIG. 11H illustrates a relative difference image indicating relative difference information that is two-dimensional data acquired by a difference calculation that subtracts, from the image of FIG. 11B as the base image, the image of FIG. 12B as a subtracted image. FIG. 11J illustrates an image indicating relative difference minimum value information acquired by extracting a minimum value of relative differences between the relative difference images (each relative difference image corresponds to the two-dimensional relative difference information) of FIGS. 11D, 11F and 11H at each of their corresponding pixel positions. In this embodiment, the relative difference minimum value information in FIG. 11J has a same value as that of the relative difference information in FIG. 11H, which indicates the position and amount of part of the unwanted component contained in the parallax image of FIG. 11B.

Figure 12C:
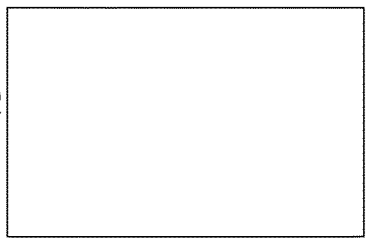

Similarly, FIG. 12C illustrates a relative difference image indicating relative difference information that is two-dimensional data acquired by a difference calculation that subtracts, from the image of FIG. 12A as a base image, the image of FIG. 11A as a subtracted image. FIG. 12E illustrates a relative difference image indicating relative difference information that is two-dimensional data acquired by a difference calculation that subtracts, from the image of FIG. 12A as the base image, the image of FIG. 11B as a subtracted image. FIG. 12G illustrates a relative difference image indicating relative difference information that is two-dimensional data acquired by a difference calculation that subtracts, from the image of FIG. 12A as the base image, the image of FIG. 12B as a subtracted image. FIG. 12I illustrates an image indicating relative difference minimum value information acquired by extracting a minimum value of relative differences between the relative difference images (each relative difference image corresponds to the two-dimensional relative difference information) of FIGS. 12C, 12E and 12G at each of their corresponding pixel positions. In this embodiment, the relative difference minimum value information in FIG. 12I has a same value as that of the relative difference information in FIG. 12C, and thereby the position and amount of the unwanted component contained in the parallax image of FIG. 12A are not detected.

Figure 12D:
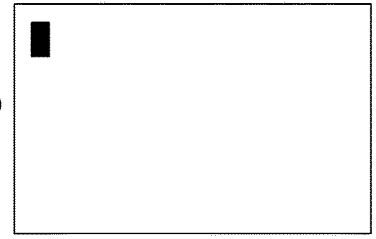
Figure 12E:
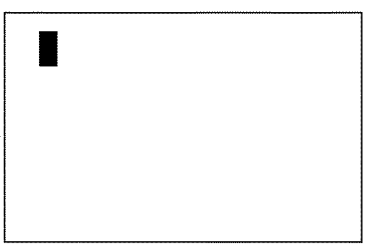
Figure 12F:
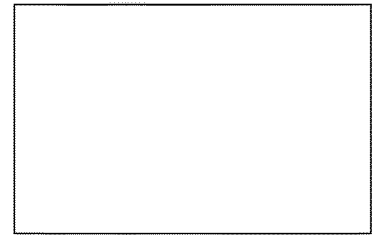
Figure 12G:
Figure 12K:
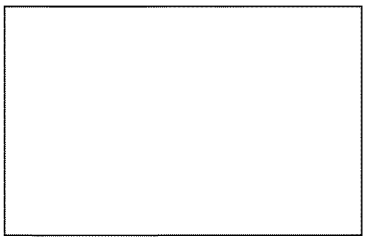
Figure 12L:
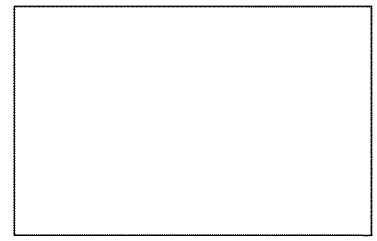

Similarly, FIG. 12D illustrates a relative difference image indicating relative difference information that is two-dimensional data acquired by a difference calculation that subtracts, from the image of FIG. 12B as a base image, the image of FIG. 11A as a subtracted image. FIG. 12F illustrates a relative difference image indicating relative difference information that is two-dimensional data acquired by a difference calculation that subtracts, from the image of FIG. 12B as the base image, the image of FIG. 11B as a subtracted image. FIG. 12H illustrates a relative difference image indicating relative difference information that is two-dimensional data acquired by a difference calculation that subtracts, from the image of FIG. 12B as the base image, the image of FIG. 12A as a subtracted image. FIG. 12J illustrates an image indicating relative difference minimum value information acquired by extracting a minimum value of relative differences between the relative difference images (each relative difference image corresponds to the two-dimensional relative difference information) of FIGS. 12D, 12F and 12H at each of their corresponding pixel positions. In this embodiment, the relative difference minimum value information in FIG. 12J has a same value as that of the relative difference information in FIG. 12F, and thereby the position and amount of the unwanted component contained in the parallax image of FIG. 12B are not detected.

Thereafter, the correction process that removes the unwanted components of FIGS. 11I, 11J, 12I and 12J is performed on the original parallax images of FIGS. 11A, 11B, 12A and 12B. However, since the relative difference minimum value images illustrated in FIGS. 12I and 12J do not contain the detected unwanted components, the correction process is substantially not performed on the parallax images of FIGS. 12A and 12B. This correction process enables providing, as illustrated in FIGS. 11K, 11L, 12K and 12L, parallax images as output images whose common unwanted components to two parallax images in the unwanted components contained in the grouped parallax images has been reduced. Furthermore, combining the parallax images whose unwanted component has been reduced to some extent enables producing, as illustrated in FIG. 2B, a combined image which is equivalent to a captured image produced by image capturing in which the pupil division is not performed and which contains less unwanted component.

Figure 13:
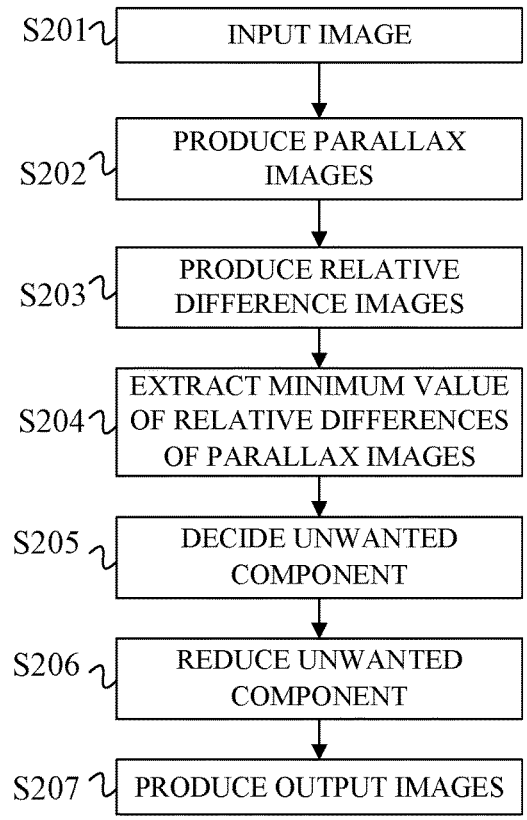
FIG. 13 is a flowchart illustrating the procedure of the image processing method of Embodiment 3.

FIG. 13 is a flowchart illustrating an example of a procedure for an unwanted-component detection/reduction process (image process) in this embodiment.

Steps S201 to step S203 are respectively same as steps S101 to S103 in Embodiment 2.

At step S204, the unwanted-component detector 204a acquires (extracts) the relative difference minimum value information of each of the corresponding pixel positions between the multiple (four) relative difference images provided at step S203. A reason for and an effect of acquiring the relative difference minimum value information are as follows. In examples illustrated in FIGS. 11A to 11L and FIGS. 12A to 12L, the part of the unwanted component contained in the parallax image of FIG. 11A is present at the same position as that of the unwanted component contained in the parallax image of FIG. 12A. As just described, the unwanted components (common unwanted components) contained in the parallax images may be present at same positions as each other depending on an optical system used and positions of a high-luminance light source. When a difference between the two parallax images is calculated in such a case, the common unwanted component has a zero value.

Differently from Embodiment 2 which acquires the relative difference maximum value information, in this embodiment which acquires the relative difference minimum value information, it is possible to detect the unwanted components contained in the grouped parallax images whose positions are all different from one another, but it is impossible to detect the common unwanted components whose positions are same as one another. However, this corresponds to detection of the unwanted component present only in one of the multiple parallax images. This corresponds to being able to separate, in one of the grouped (four) parallax images provided by image capturing of a close-distance object, the object parallax components with respect to the other three parallax images from the unwanted component. That is, when the unwanted-component reduction process is performed on each parallax image provided by image capturing of the close-distance object, this embodiment enables significantly reducing an influence of the object parallax component. As described above, acquiring the relative difference minimum value information between the relative difference images each indicating the relative difference information makes it possible to detect the unwanted component other than those present at the same positions in the multiple parallax images and to separate the object parallax components from the unwanted components in the multiple parallax images.

Next, at step S205, the unwanted-component detector 204a decides, as the unwanted component, the component left in the relative difference minimum value image acquired at step S204. The unwanted component contained in each of the original parallax images is thus detected.

Next, at step S206, the unwanted-component reducer 204b performs the correction process that removes the unwanted components detected at step S205 from the parallax images to produce the grouped parallax images as output images. In this embodiment, the unwanted-component reducer 204b produces, as the output images, the parallax image (FIG. 11K) whose pixels are each constituted by an image signal acquired from the output signal from each pixel G11 of the image sensor 202 and the parallax image (FIG. 11L) whose pixels are each constituted by an image signal acquired from the output signal from each pixel G12 of the image sensor 202. The unwanted-component reducer 204b further produces the parallax image (FIG. 12K) whose pixels are each constituted by an image signal acquired from the output signal from each pixel G13 and the parallax image (FIG. 12L) whose pixels are each constituted by an image signal acquired from the output signal from each pixel G14.

At above-described step S203, the negative value has been discarded and thereby regarded as the zero value, so that only the positive-value unwanted component contained in each of the parallax images has been detected as the relative difference minimum value information. Therefore, simply subtracting the relative difference minimum value image from each of the parallax images at step S206 enables reducing (removing) the unwanted component. That is, the unwanted-component reducer 204b subtracts the relative difference minimum value image of FIG. 11I from the parallax image of FIG. 11A and subtracts the relative difference minimum value image of FIG. 11J from the parallax image of FIG. 11B. Similarly, the unwanted-component reducer 204b subtracts the relative difference minimum value image of FIG. 12I from the parallax image of FIG. 12A and subtracts the relative difference minimum value image of FIG. 12J from the parallax image of FIG. 12B. This results in the grouped parallax images (FIGS. 11K, 11L, 12K and 12L) as the output images.

Finally, at step S207, the system controller 210 stores the output images (grouped parallax images) whose unwanted components have been reduced (removed), which are illustrated in FIGS. 11K, 11L, 12K and 12L, to the image recording medium 209. In addition, the system controller 210 displays the output images on the display unit 205. Moreover, it is also possible, by combining the grouped parallax images as the output images, to output a combined image, as illustrated in FIG. 2B, which is equivalent to a captured image produced by image capturing in which the pupil division is not performed and whose unwanted component has been sufficiently reduced.

As described above, this embodiment uses each one of the four parallax images provided by one-time image capturing as the base image and enables, by using the relative differences (relative difference information) between each of the base images and the other three parallax image, detecting the unwanted component contained in each of the parallax images (base images). That is, the image processing method of this embodiment can detect the unwanted components contained in the captured images without performing multiple-time image capturing. Moreover, this embodiment discards the unwanted component that becomes the negative value in producing the relative difference information and therefore enables detecting the unwanted component that becomes the positive value therein with a simple difference calculation. This makes it possible to provide a high-quality image whose unwanted component has been sufficiently reduced (removed) merely by subtracting the unwanted component from each of the original parallax images. Furthermore, this embodiment acquires the relative difference minimum value information from the relative difference information on the relative differences between the four parallax images. This makes it possible to separate the unwanted component from the object parallax component and to thereby effectively detect the unwanted component, which enables providing the output images in which the unwanted components have been reduced.

Embodiment 4

Next, description will be made of a fourth embodiment (Embodiment 4) of the present invention. Literature "Light Field Photography with a Hand-held Plenoptic Camera" (Stanford Tech Report CTSR 2005-2) by Ren.Ng et al. proposes a "Plenoptic Camera". The "Plenoptic Camera" can capture information on positions and angles of light rays from an object side by using a technique called "Light Field Photography".

Figure 14:
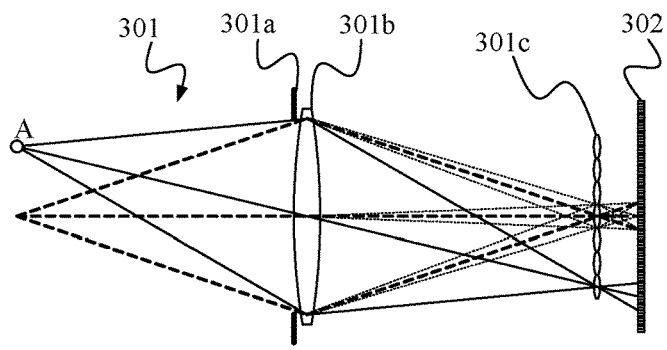
FIG. 14 illustrates an image capturing system of an image capturing apparatus that is Embodiment 4 of the present invention.

FIG. 14 illustrates a configuration of an image capturer of the "Plenoptic Camera". A microlens array 301c is disposed at an imaging position of an image capturing optical system 301 constituted by a main lens (image-taking lens) 301b and an aperture stop 301a, and an image sensor 302 is disposed behind the microlens array 301c.

The microlens array 301c serves as a separator so as to prevent light rays passing through a point located in an object space such as a point A and light rays passing through a point located near the point A from mixing with each other on the image sensor 302.

As can be understood from FIG. 14, since an upper ray, a principal ray and a lower ray are received by mutually different pixels, the light rays passing through the point A can be separated depending on angles of the light rays.

Figure 15A:
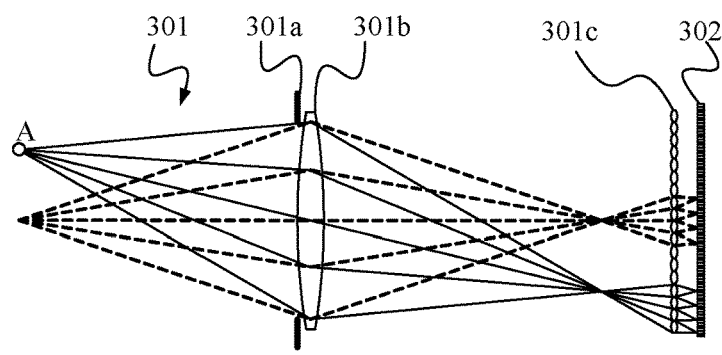
FIGS. 15A and 15B illustrate an image capturing system of another image capturing apparatus that is Embodiment 4.
Figure 15B:
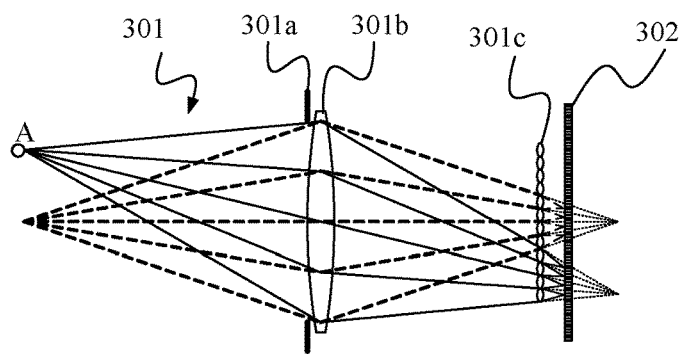

On the other hand, literature "Full Resolution Light Field Rendering" (Adobe Technical Report January 2008) by Todor Georgive et al. proposes techniques illustrated in FIGS. 15A and 15B each of which acquires information (Light Field) on position and angle of light rays.

In a configuration of the image capturer illustrated in FIG. 15A, a microlens array 301c is disposed behind an imaging position of a main lens 301b such that light rays passing through a point A located in an object space are reimaged by the microlens array 301c on an image sensor 302. This configuration separates the light rays passing through the point A depending on angles of the respective light rays to introduce the separated light rays to the image sensor 302.

In a configuration of the image capturer illustrated in FIG. 15B, a microlens array 301c is disposed in front of an imaging position of a main lens 301b such that light rays passing through a point A located in an object space is reimaged on an image sensor 302. This configuration thereby separates the light rays depending on angles of the respective light rays to introduce the separated light rays to the image sensor 302. In the both configurations illustrated in FIGS. 15A and 15B, it is common in that a light flux passing through a pupil of the image capturing optical system 301 is divided into multiple light fluxes depending on areas (positions) in the pupil through which the light fluxes pass.

Figure 16:
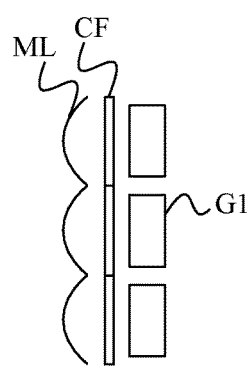
FIG. 16 illustrates a conventional image sensor.

In these configurations, as the image sensor 302, a conventional image sensor can be used in which one microlens ML and one light receiver G1 are paired as illustrated in FIG. 16. Symbol CF represents a color filter.

Use of the image capturing optical system 301 illustrated in FIG. 15A provides an image as illustrated in FIG. 17A. FIG. 17B illustrates an enlarged circle among a large number of circles arranged in FIG. 17A. Each one of the circles illustrated in FIG. 17A corresponds to an aperture stop STP illustrated in FIG. 17B; an inside of each circle is divided by multiple pixels Pj (j=1, 2, 3, . . . ). This provides an intensity distribution of the pupil within each circle. On the other hand, use of the image capturing optical systems 301 illustrated in FIGS. 14 and 15B provides multiple parallax images as illustrated in FIG. 18. Arranging and reconstructing the multiple pixels Pj located in each circle (aperture stop STP) in the image illustrated in FIG. 17A also provides the multiple parallax images as illustrated in FIG. 18.

An unwanted light such as ghost passes through the pupil with being biased. For this reason, the image capturing apparatus that performs image capturing with the pupil division as described in this embodiment can also detect the unwanted component by using any one of the image processing methods described in Embodiments 1 to 3.

Figures 19A, 19B:
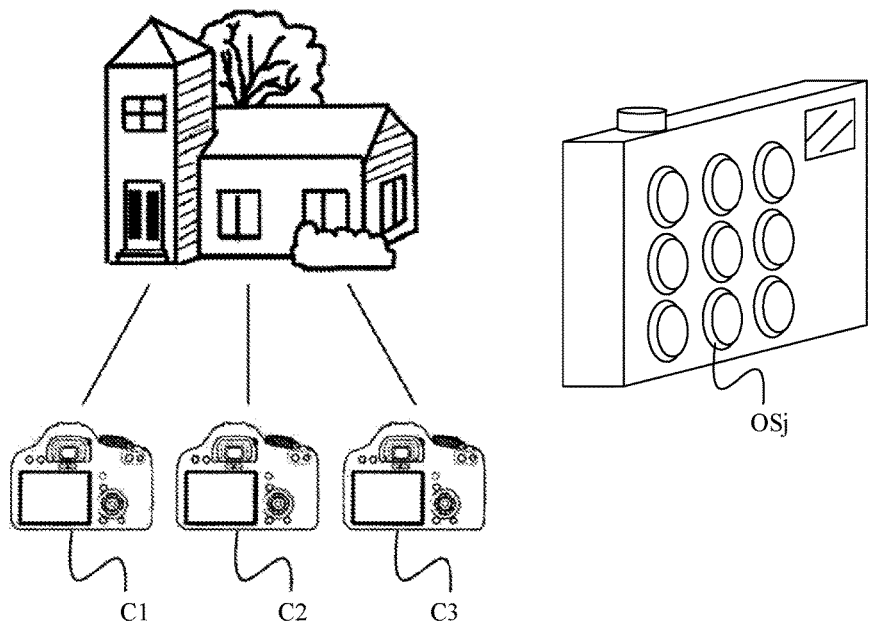
FIGS. 19A and 19B illustrate an example of another image capturing method and another image capturing apparatus of Embodiment 4.

As another example, image capturing of a same object by using multiple image capturing apparatuses C1, C2 and C3 as illustrated in FIG. 19A can provide multiple parallax images, so that this case also can use any one of the image processing methods described in Embodiments 1 to 3. Although the image capturing apparatuses C1, C2 and C3 are actually separated from one another, they can be regarded as an integrated single image capturing apparatus that performs image capturing by dividing a large pupil into three pupil areas.

In addition, as illustrated in FIG. 19B, a single image capturing apparatus including multiple image capturing optical systems OSj (j=1, 2, 3, . . . ) also can perform the pupil division.

Embodiment 5

Although each of the above embodiments described the case of detecting and removing the unwanted component in the entire area of the parallax image, in most cases the unwanted component is generated in part of the parallax image as illustrated in FIG. 2A. The unwanted component contained in the image can be easily determined by a user. Therefore, allowing the user to specify (select) a target area of the parallax image on which the unwanted-component reduction process is to be performed and performing the detection of the unwanted component only in the target area enables reducing a processing load in each embodiment. In addition, limiting the target area on which the unwanted-component reduction process is to be performed also enables reducing the above-described influence of the object parallax component generated when image capturing of the close-distance object is performed.

Figures 20A, 20B:
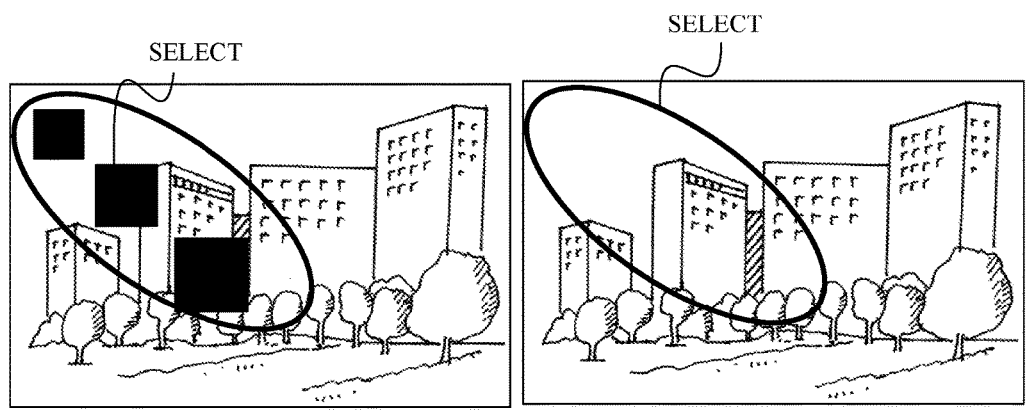
FIGS. 20A and 20B illustrate an example of an unwanted-component reduction process area, which is selected, in Embodiment 5 of the present invention.

In FIG. 20A, a solid line SELECT indicates, in a captured image (parallax image), a target area on which the unwanted-component reduction process is performed; the target area is selected by a user who desires to remove the unwanted component contained therein. FIG. 20B illustrates an output image provided after the unwanted-component in the target area SELECT is reduced. As just described, even when the area is limited on which the unwanted component is to be reduced, it is possible to detect and remove the unwanted component from the parallax image by using the image processing method described in any one of Embodiments 1 to 3.

Although each of the above embodiments described the case where the unwanted component is reduced (or removed), another correction process may alternatively be performed which adds another unwanted component to the parallax image by using information on the detected unwanted component. For instance, the multiple parallax images illustrated in FIG. 18 include at least one in which the ghost (unwanted component) is present and at least other one in which the ghost is not present. When the ghost is desired to be left in the reconstructed image, the detected ghost may be added to each of the parallax images. Moreover, the ghost may be added to the reconstructed image.

Although each of the above embodiments described the image capturing apparatus using the image processing method (in other words, including the image processing apparatus) that detects and reduces the unwanted component, the image processing method of each embodiment can be performed also by an image processing program installed in a personal computer. In this case, the personal computer corresponds to the image processing apparatus that is another embodiment of the present invention. The personal computer acquires an image (input image) before the unwanted-component reduction process from the image capturing apparatus and then performs the unwanted-component reduction process thereon by using the image processing program to output a resulting image.

Each of the above embodiments can detect the unwanted components contained in the multiple parallax images (in particular, parallax images produced by image capturing from three or more viewpoints) with good accuracy without performing the multiple-time image capturing, which enables sufficiently reducing the unwanted components from the parallax images and thereby makes it possible to provide high-quality parallax images as output images.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-255611, filed on Dec. 11, 2013, which is hereby incorporated by reference herein in its entirety.

What is claimed is:

1. An image processing method, which is implemented by a computer, comprising:
   acquiring multiple parallax images of an object captured using an image capturing optical system, the parallax images having a parallax to one another;
   acquiring, by using the respective parallax images as mutually different base images, relative difference information for each of the mutually different base images on a relative difference between that base image and at least one other parallax image in the multiple parallax images;
   detecting an unwanted component contained in each of the parallax images by using the relative difference information acquired for the mutually different base images, the unwanted component corresponding to light reflected inside the image capturing optical system; and
   outputting an output image generated based on the detected unwanted component and at least one of the parallax images.

2. The image processing method according to claim 1, wherein the multiple parallax images are three or more parallax images.

3. The image processing method according to claim 2, further comprising:
   regarding a negative value in subtracting the other parallax image from the base image to acquire the relative difference information as a zero value;
   acquiring, from the relative difference information acquired as two-dimensional information on the relative difference, a maximum value of the relative differences between each of the base image and the other parallax image at each of their corresponding pixel positions; and
   detecting the unwanted component contained in the parallax image as the base image by using the maximum value.

4. The image processing method according to claim 2, further comprising:
   regarding a negative value in subtracting the other parallax image from the base image to acquire the relative difference information as a zero value;
   acquiring, from the relative difference information acquired as two-dimensional information on the relative difference, a minimum value of the relative differences between each of the base image and the other parallax image at each of their corresponding pixel positions; and
   detecting the unwanted component contained in the parallax image as the base image by using the minimum value.

5. The image processing method according to claim 1, further comprising:
   allowing selecting, in each of the parallax images, a target area where the unwanted component is to be detected; and
   detecting the unwanted component in the target area.

6. The image processing method according to claim 1, further comprising:
   performing position matching between each of the base images and the other parallax image in acquiring the relative difference information.

7. The image processing method according to claim 1, wherein the multiple parallax images are images produced by an image capturing apparatus configured to introduce multiple light fluxes passing through mutually different areas of a pupil of an image capturing optical system to mutually different pixels provided on an image sensor and photoelectrically convert the respective light fluxes.

8. The image processing method according to claim 1, wherein the multiple parallax images are images produced by an image capturing apparatus including an image sensor provided with multiple pixel groups photoelectrically converting light fluxes from mutually different areas of a pupil of an image capturing optical system and with microlenses each provided to each of the pixel groups.

9. The image processing method according to claim 1, wherein the output image is an image where the unwanted component is removed or reduced.

10. The image processing method according to claim 1, wherein the output image is an image where another unwanted component is added.

11. An image processing apparatus comprising:
    an image acquirer configured to acquire multiple parallax images of an object captured using an image capturing optical system, the parallax images having a parallax to one another; and
    an image processor configured to perform an image processing on the parallax images,
    wherein the image processor includes a detector configured to acquire, by using the respective parallax images as mutually different base images, relative difference information for each of the mutually different base images on a relative difference between that base image and at least one other parallax image in the multiple parallax images and to detect an unwanted component contained in each of the parallax images by using the relative difference information acquired for the mutually different base images, the unwanted component corresponding to light reflected inside the image capturing optical system,
    wherein the image processor outputs an output image generated based on the detected unwanted component and at least one of the parallax images, and wherein the image acquirer and the detector are implemented by the image processor.

12. An image capturing apparatus comprising:
an image capturer including an image capturing optical system and an image sensor, the image capturer configured to produce multiple parallax images of an object captured using the image capturing optical system, the multiple parallax images having a parallax to one another; and
an image processing apparatus,
wherein the image processing apparatus comprises:
an image acquirer configured to acquire the multiple parallax images; and
a detector configured to acquire, by using the respective parallax images as mutually different base images, relative difference information for each of the mutually different base images on a relative difference between that base image and at least one other parallax image in the multiple parallax images and to detect an unwanted component contained in each of the parallax images by using the relative difference information acquired for the mutually different base images, the unwanted component corresponding to light reflected inside the image capturing optical system,
wherein the image processing apparatus outputs an output image generated based on the detected unwanted component and at least one of the parallax images, and wherein the image acquirer and the detector are implemented by an image processor.

13. A non-transitory computer-readable storage medium storing a computer program to cause a computer to execute an image process, the image process comprising:
acquiring multiple parallax images of an object captured using an image capturing optical system, the parallax images having a parallax to one another;
acquiring, by using the respective parallax images as mutually different base images, relative difference information for each of the mutually different base images on a relative difference between that base image and at least one other parallax image in the multiple parallax images;
detecting an unwanted component contained in each of the parallax images by using the relative difference information acquired for the mutually different base images, the unwanted component corresponding to light reflected inside the image capturing optical system; and
outputting an output image generated based on the detected unwanted component and at least one of the parallax images.

* * * * *